(12) United States Patent
Kataoka et al.

(10) Patent No.: US 10,020,765 B2
(45) Date of Patent: Jul. 10, 2018

(54) EXCITATION DEVICE OF AC EXCITER

(71) Applicant: Mitsubishi Electric Corporation, Chiyoda-ku, Tokyo (JP)

(72) Inventors: Michio Kataoka, Tokyo (JP); Masaru Shimomura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 43 days.

(21) Appl. No.: 14/984,239

(22) Filed: Dec. 30, 2015

(65) Prior Publication Data

US 2017/0194887 A1 Jul. 6, 2017

(51) Int. Cl.
*H02P 9/00* (2006.01)
*H02P 9/30* (2006.01)
*H02K 19/26* (2006.01)

(52) U.S. Cl.
CPC ............. *H02P 9/302* (2013.01); *H02K 19/26* (2013.01)

(58) Field of Classification Search
CPC ................. H02P 9/04; H02P 9/08; H02P 9/14
USPC ............. 322/59, 44, 89, 7; 307/11, 43, 125; 363/15, 49, 107; 290/31
See application file for complete search history.

(56) References Cited

U.S. PATENT DOCUMENTS

| | | | | |
|---|---|---|---|---|
| 3,775,663 A | * | 11/1973 | Turnbull | H02M 7/527 363/41 |
| 4,032,835 A | * | 6/1977 | Finnell | H02P 9/36 322/19 |
| 4,093,869 A | * | 6/1978 | Hoffmann | H02K 19/26 290/31 |
| 4,336,486 A | * | 6/1982 | Gorden | H02P 9/36 322/63 |
| 4,743,777 A | * | 5/1988 | Shilling | F02N 11/04 290/31 |

(Continued)

FOREIGN PATENT DOCUMENTS

EP 2 716 588 A1 4/2014
JP S63-035198 A 2/1988

(Continued)

OTHER PUBLICATIONS

Notification of Reasons for Refusal dated Oct. 3, 2017 by the Japanese Patent Office in corresponding Japanese application No. 2014-136519, with English translation (7 pages).

*Primary Examiner* — Julio C. Gonzalez Ramirez
(74) *Attorney, Agent, or Firm* — Buchanan Ingersoll & Rooney PC

(57) ABSTRACT

A gas turbine power generation system is configured by a gas turbine, a main power generator which is coupled to a rotor of the gas turbine through a rotation shaft, a rotation rectifier which converts a three-phase AC current into a DC current and transfers the DC current to a field magnet winding wire of the main power generator, an AC exciter which is configured by an armature winding wire, a d-axis field magnet winding wire, and a q-axis field magnet winding wire, and transfers the three-phase AC current generated at the armature winding wire to the rotation rectifier, an excitation device which drives the AC exciter at the time of start-up of the main power generator, and an excitation power supply which supplies a current to the excitation device.

14 Claims, 21 Drawing Sheets

(56) References Cited

U.S. PATENT DOCUMENTS

| | | | |
|---|---|---|---|
| 4,772,802 A * | 9/1988 | Glennon | F02N 11/04 290/31 |
| 5,063,490 A | 11/1991 | Maehara et al. | |
| 5,097,195 A * | 3/1992 | Raad | F02N 11/04 290/38 R |
| 6,320,767 B1 * | 11/2001 | Shimoura | H02M 7/49 363/37 |
| 6,621,719 B2 * | 9/2003 | Steimer | H02M 7/49 363/43 |
| 6,909,262 B2 * | 6/2005 | Yao | H02P 9/105 322/22 |
| 7,869,232 B2 * | 1/2011 | Nagata | H02P 21/0003 363/131 |
| 8,581,425 B2 * | 11/2013 | Rozman | F02N 11/006 290/1 A |
| 8,773,080 B2 * | 7/2014 | Albsmeier | H02P 9/04 322/24 |
| 8,872,466 B2 * | 10/2014 | Tamai | H02P 1/46 310/12.18 |
| 2003/0038483 A1 | 2/2003 | Klaar | |
| 2005/0046398 A1 | 3/2005 | Anghel et al. | |
| 2005/0093520 A1 * | 5/2005 | Muramatsu | H02M 7/53871 322/29 |
| 2009/0302788 A1 * | 12/2009 | Mitsuda | H02P 3/18 318/376 |
| 2010/0014335 A1 * | 1/2010 | Iwata | H02M 7/49 363/132 |
| 2011/0273916 A1 | 11/2011 | Fujiwara et al. | |
| 2012/0161688 A1 * | 6/2012 | Tamai | H02P 1/52 318/721 |
| 2013/0343089 A1 * | 12/2013 | Gupta | H02M 7/4807 363/16 |

FOREIGN PATENT DOCUMENTS

| | | |
|---|---|---|
| JP | 02282809 A | 11/1990 |
| JP | H05-038054 A | 2/1993 |
| JP | H07-332012 A | 12/1995 |
| JP | H09-266674 A | 10/1997 |
| JP | 2000-134997 A | 5/2000 |
| JP | 2003-143899 A | 5/2003 |
| JP | 2003-324995 A | 11/2003 |
| JP | 2005-098296 A | 4/2005 |
| JP | 2006176057 A | 7/2006 |
| WO | 2010/086929 A1 | 8/2010 |
| WO | 2012/164597 A1 | 12/2012 |

* cited by examiner

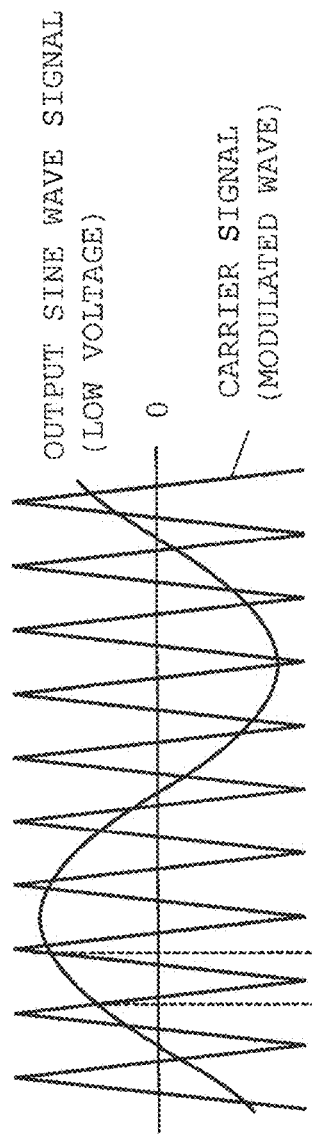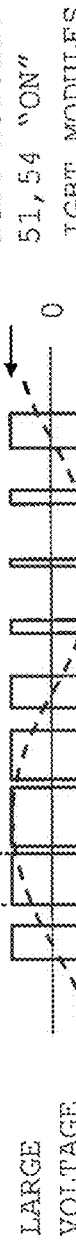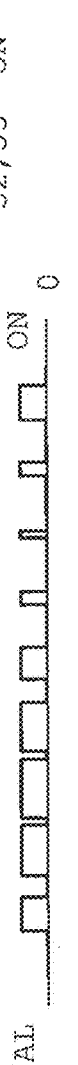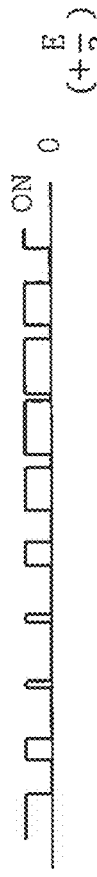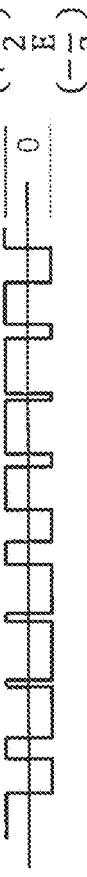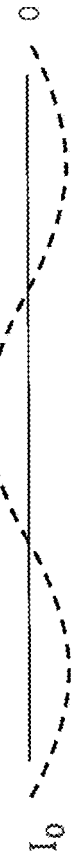

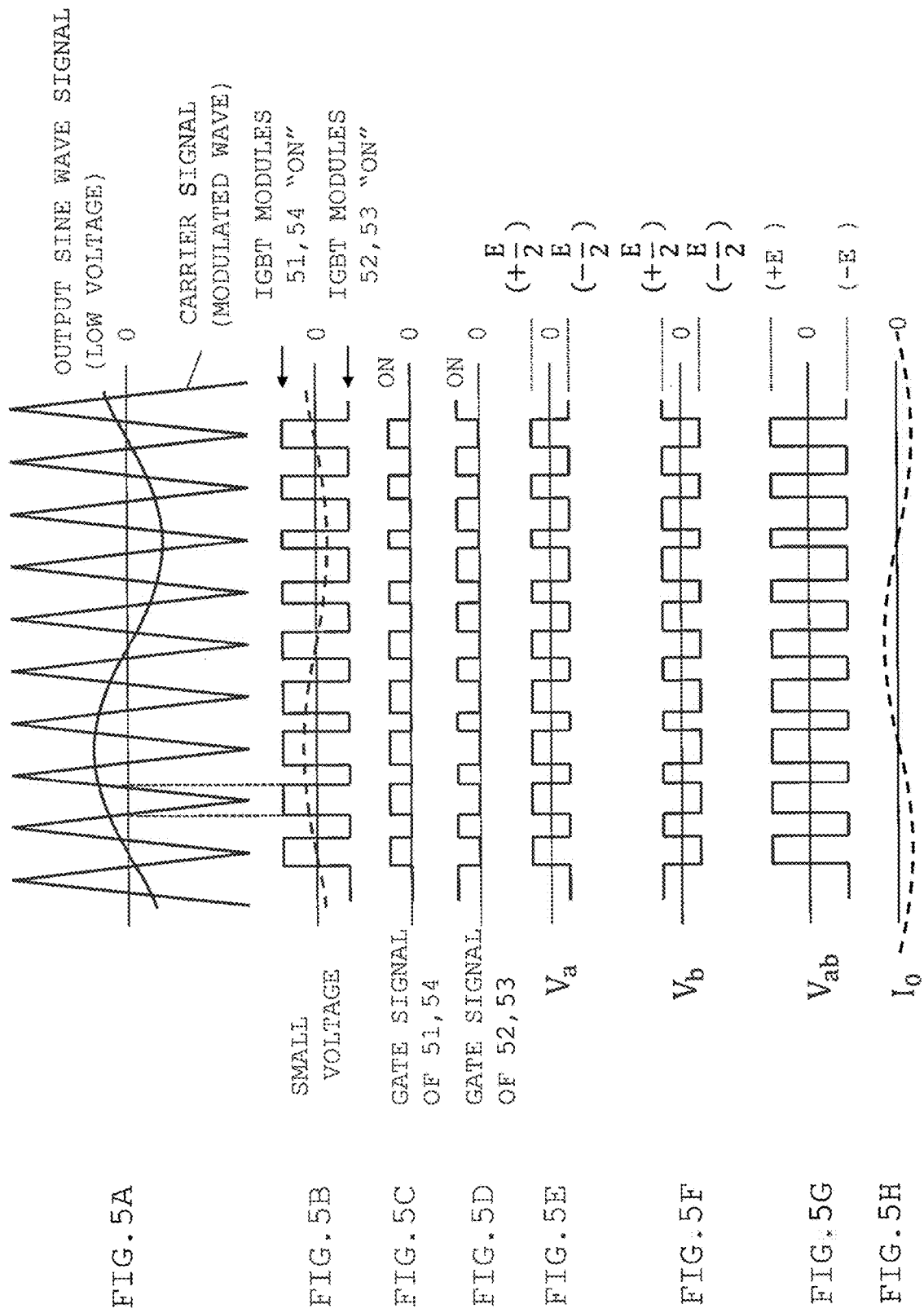

FIG. 10A GATE SIGNAL OF 53

FIG. 10B GATE SIGNAL OF 52

FIG. 10C GATE SIGNAL OF 51, 54

EXCITATION DEVICE OF AC EXCITER

BACKGROUND OF THE INVENTION

Field of the Invention

The present invention relates to an excitation device of an AC exciter which is used for start-up of a power generating device that is configured by a gas turbine and a power generator.

Background Art

In recent years, power generation facilities with high efficiency have been required from the viewpoint of the environment, and for this reason, combined cycle power generation which uses a gas turbine (GT) has increased. On the basis of this, the capacity of the gas turbine has been increased.

In the gas turbine, combustion air is compressed by a rotary compressor and the compressed combustion air is transferred to a combustor, fuel is absorbed into the combustor to be burned, and the combustion gas with a high temperature and a high pressure which occurs at that time rotates the turbine. A turbine shaft is directly coupled to the compressor, and compression power is transferred to the compressor thereby continuously driving the compressor. For this reason, at the time of start-up of the gas turbine, it is necessary to drive the compressor and a power generator which have great resistance torque using a start-up motor or the like until the gas turbine is ignited and reaches a rotation speed by which self-drive can be performed.

In this situation, a method of starting up the gas turbine is increasingly used which does not require a start-up motor and a torque converter whose sizes increase in accordance with a large capacity of power generation facilities, has no voltage drop of a house power supply due to a start-up current of the motor, uses a speed-variable inverter that can shorten axial length, and uses the power generator as a synchronous motor by converting the frequency of a commercial power supply.

At this time, it is necessary to transfer an excitation current of approximately several hundred amperes from a turning rotation speed (several times/min) to a rated rotation speed, to a field magnet winding wire of the start-up motor. However, in a normal AC exciter method, and particularly in a brushless excitation method, an AC generation voltage of the AC exciter is low and thereby sufficient excitation cannot be made in an area in which rotation speed is low such as several times/min. For this reason, thyristor excitation which can excite a field magnet winding wire by using a slip ring regardless of rotation speed is generally used.

An AC exciter which is used for a brushless excitation method generates magnetic flux using a current flowing through the field magnet winding wire, and as an armature winding wire of the AC exciter which is directly coupled to the field magnet winding wire of the power generator through a rotation shaft is interlinked with the magnetic flux, excitation power necessary for power generation is generated. If the AC exciter is a synchronous apparatus, a voltage which is applied to the field magnet winding wire is generally a DC voltage, but a three-phase winding type induction apparatus is used as the AC exciter, and as a field magnet winding wire on a primary side is set as a three-phase winding wire and an AC voltage is applied, an AC voltage is generated on a secondary side. By the excitation, start-up of a speed-variable inverter device, which is not possible in a brushless excitation method of the related art, can be made (for example, JP-A-2003-143899).

FIG. 21 is a circuit configuration diagram of a turbine power generator with a brushless exciter of the related art which can start up a gas turbine power generation device by using a speed-variable inverter device, by using a three-phase induction apparatus as an AC exciter. At the time of start-up, a three-phase AC voltage which is generated in an armature winding wire 11 is rectified by a diode of a rotation rectifier 12 and thereby becomes a DC voltage. A DC terminal of the rotation rectifier 12 is coupled to a field magnet winding wire 21 of a main power generator 2 within a rotator 4, and the field magnet winding wire 21 of the main power generator 2 becomes the rotator 4 having a magnetic polarity in a constant direction. For this reason, a variable speed inverter device 23 for start-up is coupled to an armature winding wire 22 of the main power generator 2, speed-variable power is generated by using a house power supply 71 as an input, and if a rotation magnetic field is generated in the armature winding wire 22 of the main power generator 2 and is gradually increased from a low frequency, the main power generator can be started up as a synchronous apparatus without providing another particular motor for acceleration.

In addition, after start-up and at the time of a normal drive, an excitation rectifier 43 uses an AC voltage of a permanent magnet power generator (PMG) 40 as a power supply, and rectifies an AC voltage to a DC voltage using a thyristor rectifier. As a DC excitation of a field magnet winding wire 18 of an AC exciter 9 is performed, a three-phase AC voltage is generated in the armature winding wire 11, the three-phase AC voltage is converted into a DC voltage by the rotation rectifier 12 in the same manner as at the time of start-up, a current flows through the field magnet winding wire 21 of the main power generator 2, a voltage is generated in the armature winding wire 22 of the main power generator 2, and thereafter, the voltage is synchronously input to a system power supply 72.

However, the excitation device of the AC exciter of the related art needs to establish excitation of the field magnet winding wire of the main power generator, at the time of start-up which is performed by the speed-variable inverter device. Thus, at the time of start-up, AC excitation of the field magnet winding wire of the AC exciter which employs the three-phase induction apparatus is performed, and thereafter, a gas turbine drives itself and thereby it is necessary to perform DC excitation at a point of time when the gas turbine reaches a rotation speed close to the rating. For this reason, there are problems in which a three-phase current adjustment apparatus and a thyristor for start-up, and an excitation rectifier that is used after the start-up are required as the excitation device of the AC exciter, and in addition, with respect to the field magnet winding wire of the AC exciter, a contactor for AC excitation and a contactor for switching to a rectifier for DC excitation are essential, and an output circuit is complicatedly configured.

SUMMARY OF THE INVENTION

The present invention is to solve the problems described above, and an aim is that, in excitation which is performed by an AC exciter, while taking advantage of the features of a brushless excitation type power generator which does not require a slip ring and a brush which supply a DC voltage to a rotator, start-up of a gas turbine can be made by a speed-variable inverter, and an excitation device of an AC exciter with a simple configuration is obtained.

In order to solve the above problems, an excitation device of an AC exciter according to the present invention includes a single-phase inverter which supplies a current to each of field magnet winding wires of a synchronous apparatus that is an AC exciter having the field magnet winding wires of two axes and is configured by switching elements, in which the single-phase inverter performs an inverter operation in a case of AC excitation, the single-phase inverter performs a chopper operation in a case of DC excitation, and excitement power is supplied to a power generator by the synchronous apparatus.

According to an excitation device of an AC exciter of the present invention, an extraction device is configured by two single-phase inverters, and thereby, compared to a current adjustment device of the related art, an operation of the excitation device can respond at a high speed, and in addition, at the time of start-up, excitation can be established in a field magnet winding wire of a main power generator even during a low-speed rotation, and excitation devices having the same excitation can be used even during a normal time. Thus, a circuit can be simplified.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4A to FIG. 4H are diagrams illustrating an inverter operation and output waveforms of a single-phase inverter using a PWM waveform generation method (at the time of a high voltage) according to the first embodiment.

FIG. 5A to FIG. 5H are diagrams illustrating an inverter operation and output waveforms of a single-phase inverter using a PWM waveform generation method (at the time of a low voltage) according to the first embodiment.

DETAILED DESCRIPTION OF THE INVENTION

First Embodiment

In a first embodiment, a synchronous apparatus having two field magnet winding wires of a d-axis and a q-axis is applied to a brushless excitation type exciter, as an AC exciter. Hereinafter, the first embodiment of the present invention will be described with reference to FIG. 1 to FIG. 8.

Figure 1:
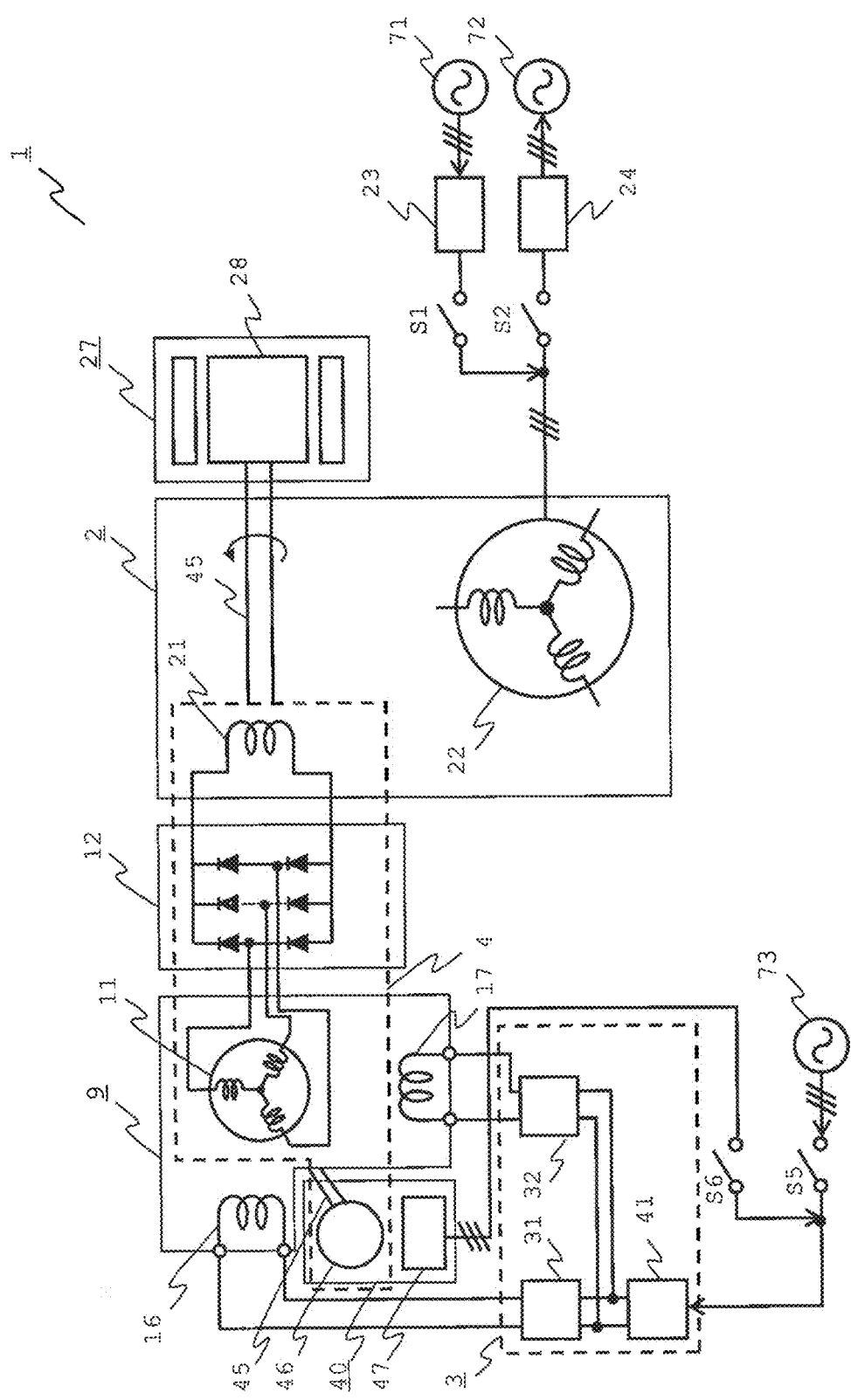
FIG. 1 is a configuration diagram of a gas turbine power generation system which is controlled by an AC exciter including an excitation device according to a first embodiment.
Figure 2:
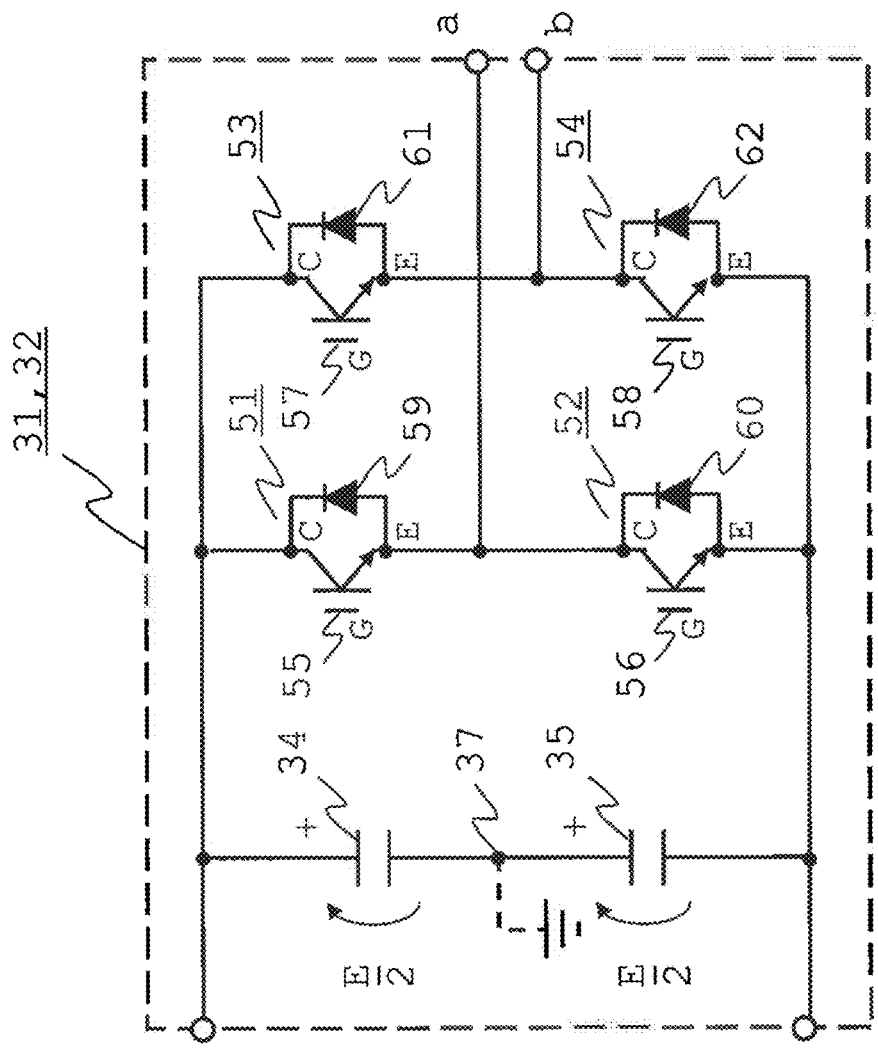
FIG. 2 is a circuit diagram of a single-phase inverter of the excitation device according to the first embodiment.
Figure 3:
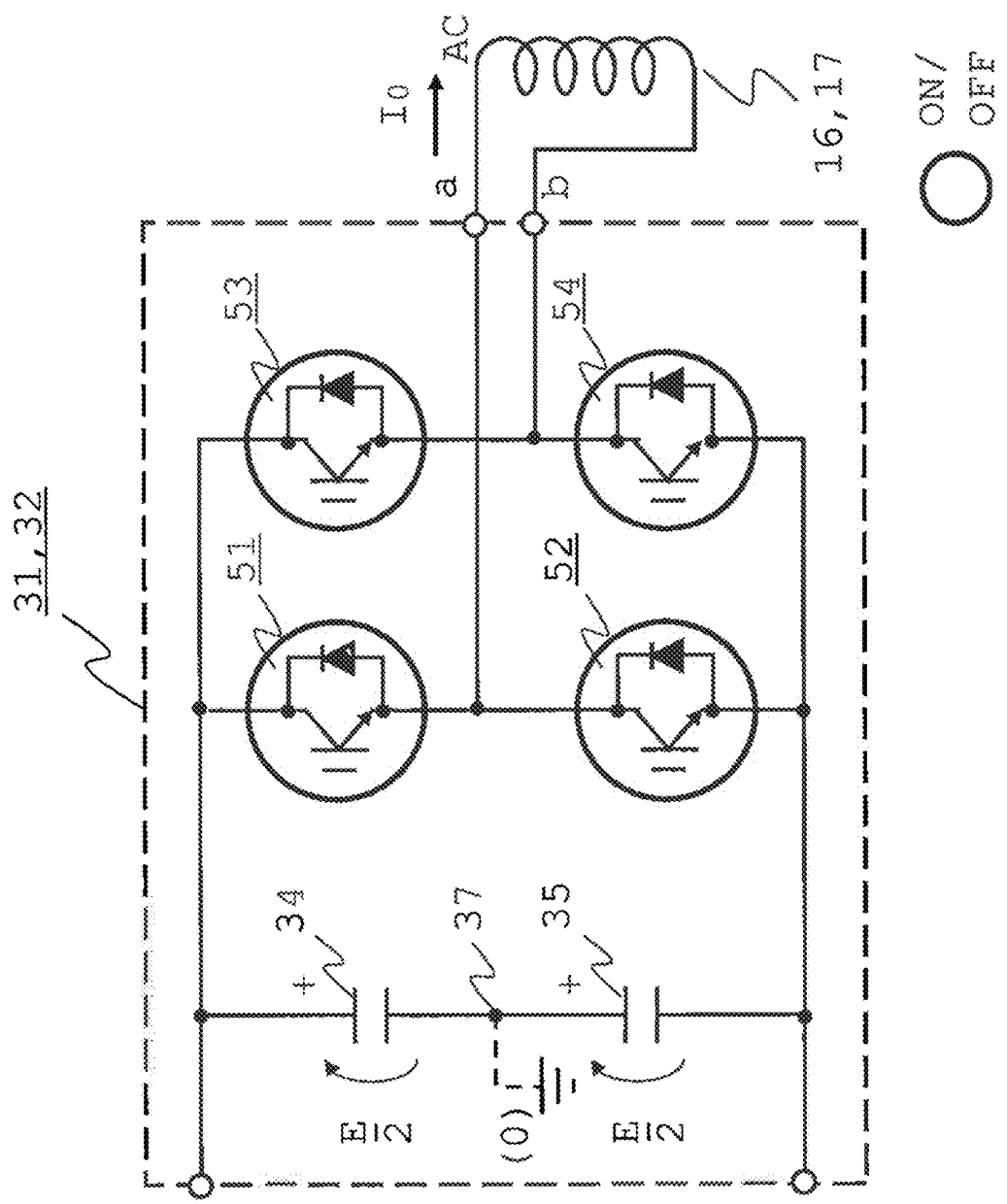
FIG. 3 is a circuit diagram illustrating an operation of the single-phase inverter coupled to a field magnet winding wire which performs an AC excitation operation of the excitation device according to the first embodiment.

FIG. 1 is a schematic circuit configuration diagram illustrating the entirety of a gas turbine power generation system which is controlled by an AC exciter including an excitation device according to the first embodiment, FIG. 2 is a circuit diagram of a single-phase inverter of the excitation device, and FIG. 3 is another circuit diagram illustrating the single-phase inverter which is coupled to a field magnet winding wire.

First of all, a configuration of the gas turbine power generation system which is controlled by the AC exciter including the excitation device according to the first embodiment will be described with reference to FIG. 1. In FIG. 1, a gas turbine power generation system 1 which is controlled by an AC exciter 9 including an excitation device 3 includes a gas turbine 27, a main power generator 2 which is coupled to a rotor 28 of the gas turbine 27 through a rotation shaft 45, a rotation rectifier 12 which converts a three-phase AC current into a DC current and transfers the DC current to a field magnet winding wire 21 of the main power generator 2, the AC exciter 9 which is configured by an armature winding wire 11, a d-axis field magnet winding wire 16, and a q-axis field magnet winding wire 17, and transfers a three-phase AC current generated at the armature winding wire 11 to the rotation rectifier 12, the excitation device 3 which drives the AC exciter 9 at the time of start-up of the main power generator 2, and an excitation power supply 73 which supplies a current to the excitation device 3. Here, the rotation shaft 45 of a field magnet 46 of a permanent magnet power generator (hereinafter, referred to as PMG) 40 is mechanically coupled to the armature winding wire 11 of the AC exciter 9. In addition, the rotation shaft 45 is also mechanically coupled to the rotation rectifier 12 and the field magnet winding wire 21 of the main power generator 2, and those configure a rotor 4 which rotates as one piece.

In addition, in order to drive the main power generator 2 as a synchronous motor at the time of start-up, a house power supply 71 which is used as a power supply that transfers power to an armature winding wire 22 of the main power generator 2, a variable speed inverter device (or thyristor start-up device) 23 which converts power of the house power supply 71, and a starting contactor S1 which couples the variable speed inverter device 23 to the armature winding wire 22 are included in the gas turbine power generation system 1.

Furthermore, a breaker S2 for a system which couples power generated at the armature winding wire 22 of the main power generator 2 to the system by the gas turbine 27 after the start-up is completed, a system interconnection transformer 24 which transforms a voltage in accordance with the system, and a system power supply 72 which is an interconnection destination that transmits the generated power are included in the gas turbine power generation system 1.

The excitation device 3 is configured by a converter 41 which is coupled to a start-up contactor S5 at the time of start-up of the main power generator 2 and converts an AC current of the excitation power supply 73 into a DC current, and furthermore a single-phase inverter 31 and a single-phase inverter 32 which convert a DC current into an AC current and respectively transfer the AC current to the d-axis field magnet winding wire 16 and the q-axis field magnet winding wire 17 of the AC exciter 9. As the AC current is transferred to the d-axis field magnet winding wire 16 and the q-axis field magnet winding wire 17, the armature winding wire 11 which is a rotor of the AC exciter 9 is rotatably driven, and the main power generator 2 starts up. In addition, as illustrated in FIG. 2, the single-phase inverters 31 and 32 are respectively configured by four IGBT modules 51 to 54 which serve as switching elements. In addition, on an input side of the IGBT modules 51 to 54, DC capacitors 34 and 35 which are coupled in series to each other are arranged in parallel to the IGBT modules 51 to 54.

In addition, the AC exciter 9 is configured by the armature winding wire 11 which is a rotator, and the d-axis field magnet winding wire 16 and the q-axis field magnet winding wire 17 which are stators. The armature winding wire 11 is mechanically connected to the field magnet 46 of a PMG 40 through the rotation shaft 45 as described above. After the start-up of the main power generator 2 is completed and at the time of a normal drive, the start-up contactor S5 is switched to a normal contactor S6, the field magnet 46 of the PMG 40 also rotates by the armature winding wire 11 which rotates, and thereby a three-phase AC current generated in an armature 47 which is a stator of the PMG 40 is transferred to the excitation device 3.

An operation of the excitation device of the AC exciter according to the first embodiment will be described with reference to FIG. 1 to FIG. 5.

1) Inverter Operation (AC Excitation Operation) of Single-Phase Inverter of Excitation Device at the Time of Start-up, and Operation of AC Exciter and Main Power Generator Operation of Excitation Device at the Time of Start-up An operation of the excitation device at the time of start-up of the gas turbine power generation system 1 will be described. At the time of start-up, the power supply is coupled to the excitation device 3 of the AC exciter 9, and in this state, the start-up contactor S5 is switched on and the normal contactor S6 is switched off.

The converter 41 converts an AC current of the excitation power supply 73 into a DC current. Furthermore, based on the DC current of the converter 41, the single-phase inverter 31 makes the switching elements of IGBT modules 51 to 54 perform inverter operations to generate an AC current, and thereby AC excitation of the d-axis field magnet winding wire 16 of the AC exciter 9 is performed. In the same manner, the single-phase inverter 32 makes the switching elements of IGBT modules 51 to 54 perform inverter operations to generate an AC current, and thereby AC excitation of the q-axis field magnet winding wire 17 of the AC exciter 9 is performed. The d-axis field magnet winding wire 16 and the q-axis field magnet winding wire 17 of the AC exciter 9 have a phase difference of 90 degrees between each other. For this reason, a phase difference between an output voltage of the single-phase inverter 31 and an output voltage of the single-phase inverter 32 causes a phase difference of 90 degrees between the d-axis field magnet winding wire 16 and the q-axis field magnet winding wire 17 of the AC exciter 9.

Inverter Operation (AC Excitation Operation) of Single-Phase Inverter

Subsequently, circuits and inverter operations (AC excitation operation) of the single-phase inverters 31 and 32 which are used for the excitation device 3 of the AC exciter 9 will be described in detail. As illustrated in FIG. 2, the single-phase inverters 31 and 32 are switching elements, are respectively configured by four IGBT modules 51 to 54, and respectively have a configuration in which the DC capacitors 34 and 35 coupled in series to each other to smooth voltage ripples are arranged in parallel with the IGBT modules on the input side of the IGBT module group. An output terminal a of the IGBT modules 51 and 52, and an output terminal b of the IGBT modules 53 and 54 become output terminals of the single-phase inverters 31 and 32, and the two single-phase inverters 33 and 32 are respectively coupled to the d-axis field magnet winding wire 16 and the q-axis field magnet winding wire 17.

The IGBT modules 51, 52, 53, and 54 are respectively configured by IGBT elements 55, 56, 57, and 58, and diode elements 59, 60, 61, and 62. That is, each IGBT module is basically configured by a combination of one IGBT element and one diode element coupled antiparallel to the one IGBT element. The IGBT module performs a turn-on operation in which a current flows from a collector C to an emitter E by applying an ON signal to a gate G.

FIG. 3 is a circuit diagram illustrating an operation of the single-phase inverter coupled to the field magnet winding wire which performs an AC excitation operation of the excitation device at the time of start-up. FIG. 4A to FIG. 4H illustrate examples in which the single-phase inverter performs an inverter operation using a pulse width modulation (PWM) waveform generation method (at the time of a high voltage). FIG. 4A illustrates an example of an output current waveform in a case in which output voltages of the single-phase inverters 31 and 32 are high (at the time of a high voltage). In FIG. 3, the output terminal a and the output terminal b of the single-phase inverters 31 and 32 are respectively coupled to the d-axis field magnet winding wire 16 or the q-axis field magnet winding wire 17 of AC exciter 9.

Here, FIG. 4E to FIG. 4G illustrate voltage waveforms in which a midpoint 37 is used as a reference, in a case in which a DC voltage E that is an output of the converter 41 is used as two DC power supplies of ±(E/2).

As illustrated in FIG. 4A, a carrier (modulated wave) signal of a triangular wave and an output sine wave signal are compared with each other, and if the output sine wave signal is larger than the carrier signal, the IGBT module 51 on a positive polarity side is turned on, and if the output sine wave signal is smaller than the carrier signal, the IGBT module 52 on a negative polarity side is turned on. A PWM waveform which is generated in accordance with this is illustrated in FIG. 4B. In FIG. 3, the IGBT module 51 and the IGBT module 54 are turned on or off at the same timing, and the IGBT module 52 and the IGBT module 53 are turned on or off at the same timing. Here, simultaneous turn-on of both the IGBT module 51 and the IGBT module 52 (or, the IGBT module 53 and the IGBT module 54) is not performed because it is a DC short-circuit.

In addition, there are examples in which FIG. 4C illustrates a gate signal waveform of each of the IGBT module 51 and the IGBT module 54, FIG. 4D illustrates a gate signal waveform of each of the IGBT module 52 and the IGBT module 53, FIG. 4E illustrates a voltage waveform Va of the output terminal a, FIG. 4F illustrates a voltage waveform Vb of the output terminal b, FIG. 4G illustrates a voltage waveform Vab (voltage which is obtained by viewing the output terminal a from the output terminal b) between the output terminals a and b, and FIG. 4H illustrates a current waveform I0 in a case in which the d-axis field magnet winding wire 16 or the q-axis field magnet winding wire 17 of the AC exciter 9 is used as a load.

As illustrated in FIG. 4E, the voltage waveform Va of the output terminal a becomes a voltage of (+E/2) if the IGBT module 51 and the IGBT module 54 are turned on, and becomes a voltage of (−E/2) if the IGBT module 52 and the IGBT module 53 are turned on. As illustrated in FIG. 4F, the voltage waveform Vb of the output terminal b becomes a voltage of (+E/2) if the IGBT module 52 and the IGBT module 53 are turned on, and becomes a voltage of (−E/2) if the IGBT module 51 and the IGBT module 54 are turned on. In addition, as illustrated in FIG. 4G, a voltage waveform Vab between the output terminal a and the output terminal b can be calculated by Va−Vb.

FIG. 5A to FIG. 5H illustrate examples in which the single-phase inverter performs an inverter operation using a PWM waveform generation method (at the time of a low voltage). In the same manner as in a case of a high voltage, as illustrated in FIG. 5A, a carrier (modulated wave) signal of a triangular wave and an output sine wave signal are compared with each other, and if the output sine wave signal is larger than the carrier signal, the IGBT module 51 on a positive polarity side is turned on, and if the output sine wave signal is smaller than the carrier signal, the IGBT module 52 on a negative polarity side is turned on. A PWM waveform which is generated in accordance with this is illustrated in FIG. 5B. Here, as the output sine wave signal is smaller than the carrier signal of the triangular wave, a gate signal is obtained.

In addition, there are examples in which FIG. 5C illustrates a gate signal waveform of each of the IGBT module 51 and the IGBT module 54, FIG. 5D illustrates a gate signal waveform of each of the IGBT module 52 and the IGBT module 53, FIG. 5E illustrates a voltage waveform Va of the output terminal a, FIG. 5F illustrates a voltage waveform Vb of the output terminal b, FIG. 5G illustrates a voltage waveform Vab (=Va−Vb) (voltage which is obtained by viewing the output terminal a from the output terminal b) between the output terminals a and b, and FIG. 5H illustrates a current waveform I0 in a case in which the d-axis field magnet winding wire 16 or the q-axis field magnet winding wire 17 of the AC exciter 9 is used as a load.

That is, as the output sine wave signal is smaller, ON periods of the voltages Va and Vb are reduced, and fundamental frequency components of the voltage of Vab (=Va−Vb) become smaller.

In the above description, for the sake of a brief description, the midpoint 37 of the DC capacitors 34 and 35 which are coupled in series to each other is used as a voltage reference, but in an actual circuit, the operation is not changed even though the DC capacitors are not grounded. In addition, in order to reduce output harmonics of the single-phase inverters 31 and 32, a filter may be inserted. In addition, the DC capacitors 34 and 35 are used as capacitors, but may be capacitors which can operate using an AC current.

Operation at the Time of Start-up of Main Power Generator

Subsequently, an operation at the time of start-up of the main power generator 2 will be described. Here, in FIG. 1, the start-up contactor S5 is switched on, the normal contactor S6 is switched off, the converter 41 receives the excitation power supply 73 and converts an AC voltage into a DC voltage, and the single-phase inverters 31 and 32 perform inverter operations in which the DC voltage of the converter 41 is converted into an AC voltage. By the operations of the single-phase inverters 31 and 32, the excitation device 3 performs AC excitation with respect to the d-axis field magnet winding wire 16 and the q-axis field magnet winding wire 17 of the AC exciter 9. As a result, even in a case of a slow rotation speed, a three-phase AC voltage is induced to the armature winding wire 11 of the AC exciter 9, and furthermore, the three-phase AC voltage is converted into an AC voltage by the rotation rectifier 12, and excitation is established in the field magnet winding wire 21 of the main power generator 2.

Here, the main power generator 2 is a synchronous apparatus, and can also function as a synchronous motor. For this reason, if the variable speed inverter device 23 is coupled to the armature winding wire 22 of the main power generator 2 and is driven and thereby the main power generator 2 can be started up as a synchronous motor. That is, the variable speed inverter device 23 for start-up generates power of a variable speed by using the house power supply 71 as an input power supply, and gradually increases a rotating magnetic field of the armature winding wire 22 of the main power generator 2 from a low frequency. Since the field magnet winding wire 21 is excited by the AC exciter 9 in advance, the rotation speed of the main power generator the main power generator 2 increases in synchronization with the rotating magnetic field.

2) Chopper Operation (DC Excitation Operation) of Single-Phase Inverter of Excitation Device after Start-up and at the Time of Normal Drive, and Operations of AC Exciter and Main Power Generator Chopper Operation (DC Excitation Operation) of Single-Phase Inverter Subsequently, circuits of the single-phase inverters 31 and 32 and a chopper operation (DC excitation operation) thereof will be described.

Figure 6:
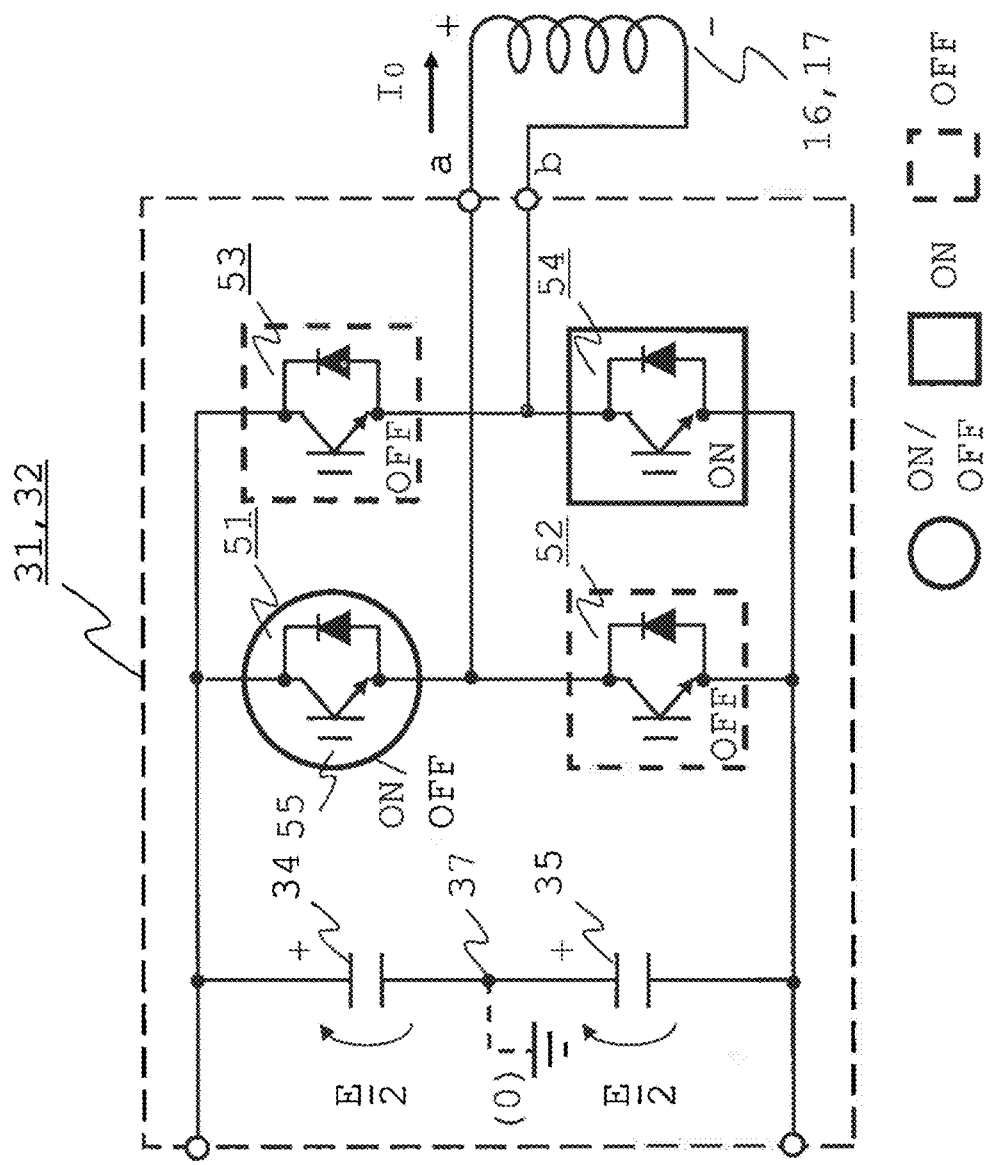
FIG. 6 is a circuit diagram illustrating an operation of the single-phase inverter which performs a DC excitation operation of the excitation device according to the first embodiment.
Figure 7:
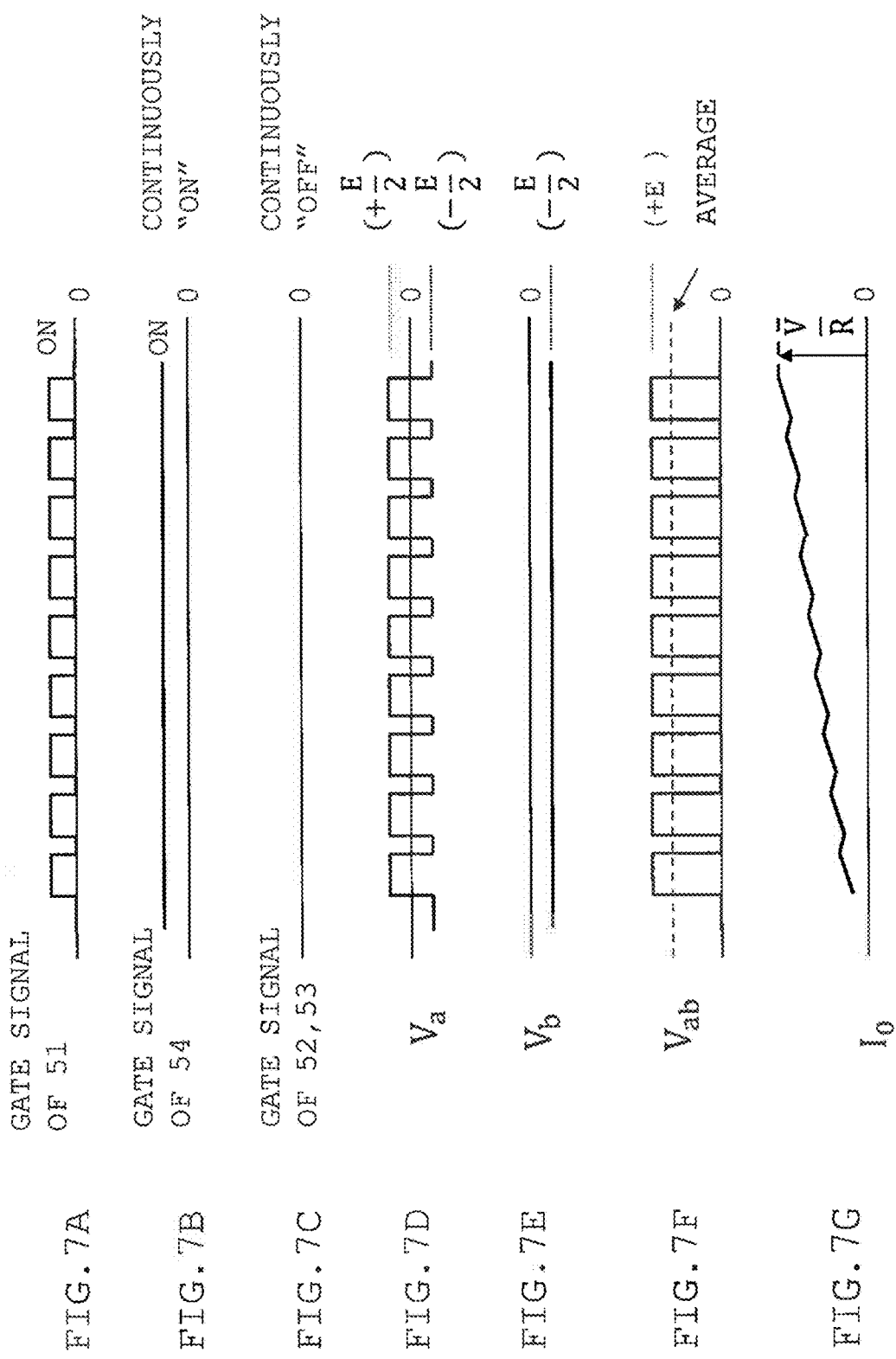
FIG. 7A to FIG. 7G are diagrams illustrating output waveforms of the single-phase inverter which performs a DC excitation operation of the excitation device according to the first embodiment.

FIG. 6 is a circuit diagram illustrating an operation of the single-phase inverter which performs a DC excitation operation of the excitation device at the time of a normal drive, and FIG. 7A to FIG. 7G illustrate output waveforms of the single-phase inverter which is controlled by the DC excitation operation of the excitation device. In FIG. 6, it is assumed that the IGBT module 51 performs an ON and OFF switching operation, the IGBT module 54 continuously performs an ON operation, and the IGBT modules 52 and 53 continuously perform an OFF operation.

Here, in the figure, a circle of a solid line denotes an ON and OFF switching operation of the IGBT module, a square of a solid line denotes a continuous ON operation, and squares of a dashed line denote a continuous OFF operation. In the operation of the circuit, the chopper operation which is switched on or off by an IGBT element 55 of the IGBT module 51 is performed by using the DC voltage, and a voltage can be adjusted by a ratio of an ON period of the IGBT element during a predetermined period. Vab becomes a positive voltage. FIG. 7A to FIG. 7G illustrate waveforms in a case in which the single-phase inverter 31 or the single-phase inverter 32 performs a chopper operation (positive operation) and thereby a positive (+) voltage is output to the output terminal a, and a negative (−) voltage is output to the output terminal b.

In addition, there are examples in which FIG. 7A illustrates a gate signal waveform of the IGBT module 51, 7B illustrates a gate signal waveform of the IGBT module 54, FIG. 7C illustrates a gate signal waveform of each of the IGBT module 52 and the IGBT module 53, FIG. 7D illustrates a voltage waveform Va of the output terminal a, FIG. 7E illustrates a voltage waveform Vb of the output terminal b, FIG. 7F illustrates a voltage waveform Vab (=Va−Vb) (voltage which is obtained by viewing the output terminal a from the output terminal b) between the output terminals a and b, and FIG. 7G illustrates a current waveform I0 in a case in which the d-axis field magnet winding wire 16 or the q-axis field magnet winding wire 17 of the AC exciter 9 is used as a load. Here, a midpoint 37 of the DC capacitors is used as a voltage reference.

As illustrated in FIG. 7C, the IGBT module 52 and the IGBT module 53 are continuously turned off. As illustrated in FIG. 7D, the voltage waveform Va of the output terminal a becomes a voltage of (+E/2) if the IGBT module 51 is turned on, and becomes a voltage of (−E/2) if the IGBT module 51 is turned off. As illustrated in FIG. 7E, the voltage waveform Vb of the output terminal b becomes a voltage of (−E/2) all the time. In addition, as illustrated in FIG. 7F, a voltage waveform Vab between the output terminals a and b can be calculated by Va−Vb. As illustrated in FIG. 7G, a current waveform I0 increases if the voltage waveform Vab increases toward a positive polarity side, and normally becomes a current value which is determined by a resistance R of each of the field magnet winding wires 16 and 17, and a voltage V.

Operation of Main Power Generator after Start-up

As described above, in FIG. 1, the main power generator 2 operates as a synchronous motor at the time of start-up, but the gas turbine 27 is ignited to be autonomously driven, and then if the gas turbine 27 reaches a predetermined rotation speed, the variable speed inverter device 23 stops, and the start-up contactor S1 is switched off. In addition, since excitation of the field magnet winding wires 16 and 17 is stopped, the single-phase inverters 31 and 32 which perform an AC excitation operation stop, and the converter 41 stops. Thereafter, the normal contactor S6 is switched on and the start-up contactor S5 is switched off in the vicinity of the rated rotation speed, and thereby an input power supply of the excitation device 3 is switched from the excitation power supply 73 to a power supply which operates in accordance with the power generated by the armature 47 of the PMG 40. The field magnet 46 of the PMG 40 uses a permanent magnet, and the armature 47 of the PMG 40 generates three-phase AC power by using a permanent magnet as a rotator. The converter 41 uses the three-phase AC power of the PMG 40 as a power supply to rectify AC power to DC power, and supplies the DC power to the single-phase inverters 31 and 32.

As described above, the single-phase inverters 31 and 32 perform a DC-DC voltage conversion and perform the DC excitation of the d-axis field magnet winding wire 16 and the q-axis field magnet winding wire 17 of the AC exciter 9, using the DC power from the converter 41 as an input through the chopper operation. Accordingly, a three-phase AC current is generated by the armature winding wire 11, the three-phase AC current is converted into a DC current by the rotation rectifier 12 in the same manner at the time of start-up to be transferred to the field magnet winding wire 21 of the main power generator 2, AC power is generated by the armature winding wire 22 of the main power generator 2, and thereafter the AC power is synchronously input to the system power supply 72 through the breaker S2 and the system interconnection transformer 24.

Figure 8:
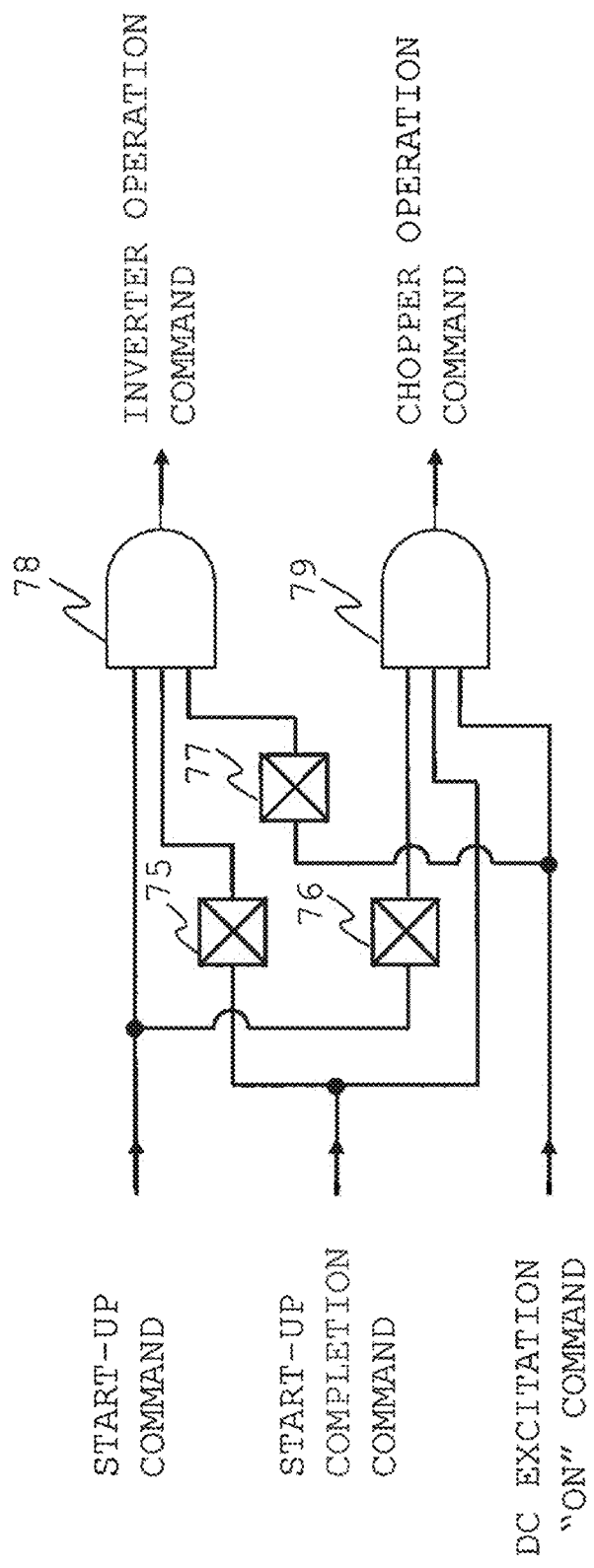
FIG. 8 is a diagram illustrating an operation logic circuit of the single-phase inverter which is performed from start-up to a rated operation of the excitation device according to the first embodiment.

FIG. 8 illustrates an operation logic circuit of the single-phase inverters 31 and 32 which operate from start-up of the main power generator 2 to a rated operation. The operation logic circuit is configured by NOT logic units 75, 76, and 77, and AND logic units 78 and 79. An inverter operation command is output from the AND logic unit 78 which receives a start-up command, an output of the NOT logic unit 75 receiving a start-up completion command, and an output of the NOT logic unit 77 receiving DC excitation ON command. In addition, a chopper operation command is output from an AND logic unit 79 which receives an output of the NOT logic unit 76 receiving the start-up command, the start-up completion command, and the DC excitation ON command.

In this way, according to the excitation device of the AC exciter according to the first embodiment, the excitation device can share the AC excitation at the time of start-up and the DC excitation after the start-up is completed, and it is not necessary to provide a contactor for switching a circuit at the time of start-up and after the start-up is completed, a simple output circuit can be configured, both the d-axis field magnet excitation and the q-axis field magnet excitation of the AC exciter can be simultaneously changed, and thus control accuracy can be improved and control response can be quickened.

In the above description, the single-phase inverter 31 and the single-phase inverter 32 are coupled so as to share a DC output of the converter 41, but the converter may be provided for each single-phase inverter. In addition, in a circuit diagram of the single-phase inverters 31 and 32, a junction 37 (midpoint) of the DC capacitors 34 and 35 which are coupled in series is grounded, but it is just for description, and the junction 37 may not be grounded. In addition, in the circuit diagram of the single-phase inverters 31 and 32, a case in which the DC capacitors 34 and 35 are arranged in the single-phase inverters 31 and 32 is illustrated, but the single-phase inverters 31 and 32 may be coupled to a DC side, and may be disposed on the converter 41 side.

In addition, in the above description, the switching operation is performed only by a pulse width modulation (PWM) method, but a voltage may be able to be generated between the output terminals a and b which are load terminals, and may be performed by other switching methods.

In addition, in the description, a case in which the PMG 40 is used as a power generator for excitation is described, but the PMG 40 may be another power generator.

Second Embodiment

Figure 9:
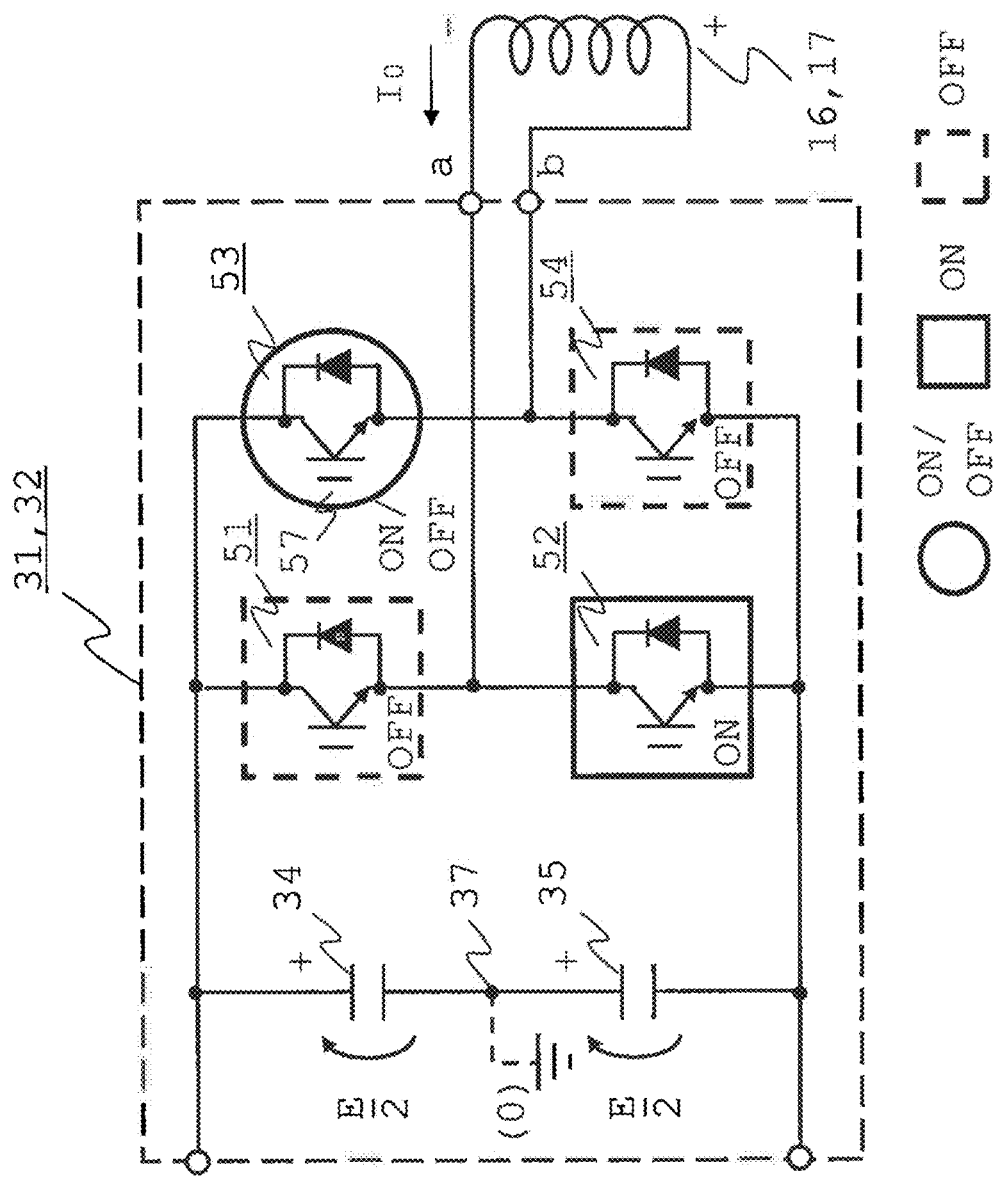
FIG. 9 is a circuit diagram illustrating an operation of a single-phase inverter which performs a DC excitation operation of an excitation device according to a second embodiment.

FIG. 9 is a circuit diagram illustrating an operation of a single-phase inverter coupled to a field magnet winding wire which performs a DC excitation operation of an excitation device of an AC excitation according to a second embodiment. FIG. 10A to FIG. 10G illustrate output waveforms of the single-phase inverter which is controlled by a DC excitation operation of the excitation device. A difference between the circuit diagram of FIG. 9 and the circuit diagram illustrating the operation of the single-phase inverter which is performed by the DC excitation operation of the excitation device according to the first embodiment illustrated in FIG. 6 is IGBT modules which perform an ON and OFF switching operation. Circuit diagrams of the single-phase inverters are the same as those according to the first embodiment, and description thereof will be omitted.

Subsequently, circuits of the single-phase inverters 31 and 32 according to a second embodiment and an chopper operation (DC excitation operation) thereof will be described.

In FIG. 9, it is assumed that the IGBT module 53 performs an ON and OFF switching operation, the IGBT module 52 continuously performs an ON operation, and the IGBT modules 51 and 54 continuously perform an OFF operation. Here, in the figure, a circle of a solid line denotes an ON and OFF switching operation of the IGBT module, a square of a solid line denotes a continuous ON operation, and squares of a dashed line denote a continuous OFF operation. In the operation of the circuit, the chopper operation which is switched on or off by an IGBT element 57 of the IGBT module 53 is performed by using the DC voltage, and a voltage can be adjusted by a ratio of an ON period of the IGBT element during a predetermined period. Differently from the first embodiment, Vab becomes a negative voltage. FIG. 10A to FIG. 10G illustrate waveforms in a case in which the single-phase inverter 31 or 32 performs the chopper operation (negative operation) and thereby a negative (−) voltage is output to the output terminal a, and a positive (+) voltage is output to the output terminal b.

Figure 10:
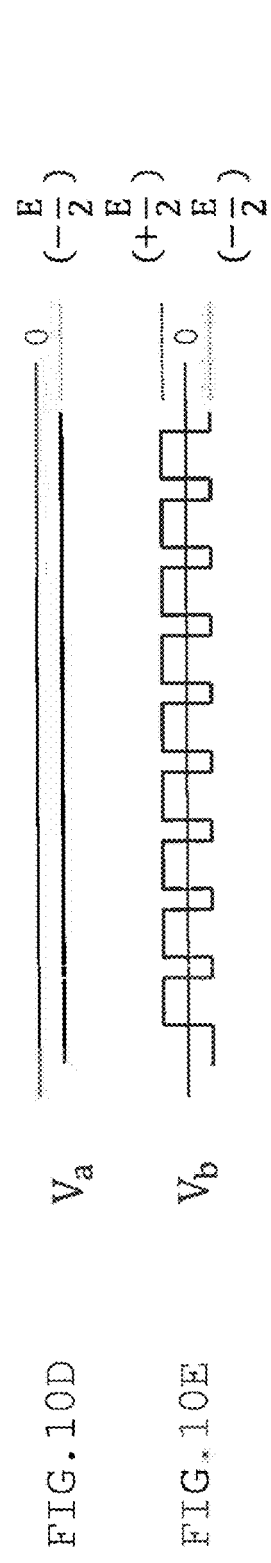
FIG. 10A to FIG. 10G are diagrams illustrating output waveforms of the single-phase inverter which performs a DC excitation operation of the excitation device according to the second embodiment.

In addition, there are examples in which FIG. 10A illustrates a gate signal waveform of the IGBT module 53, FIG. 10B illustrates a gate signal waveform of the IGBT module 52, FIG. 10C illustrates a gate signal waveform of each of the IGBT module 51 and the IGBT module 54, FIG. 10D illustrates a voltage waveform Va of the output terminal a, FIG. 10E illustrates a voltage waveform Vb of the output terminal b, FIG. 10F illustrates a voltage waveform Vab (=Va−Vb) (voltage which is obtained by viewing the output terminal a from the output terminal b) between the output terminals a and b, and FIG. 10G illustrates a current waveform I0 in a case in which the d-axis field magnet winding wire 16 or the q-axis field magnet winding wire 17 of the AC exciter 9 is used as a load. Here, the midpoint 37 of the DC capacitors is used as a voltage reference.

As illustrated in FIG. 10C, the IGBT module 51 and the IGBT module 54 are continuously turned off. As illustrated in FIG. 10D, the voltage waveform Va of the output terminal a becomes a voltage of (−E/2) all the time, and as illustrated in FIG. 10E, the voltage waveform Vb of the output terminal b becomes a voltage of (+E/2) if the IGBT module 53 is turned on, and becomes a voltage of (−E/2) if the IGBT module 53 is turned off. In addition, as illustrated in FIG. 10F, a voltage waveform Vab between the output terminals a and b can be calculated by Va−Vb. As illustrated in FIG. 10G, a current waveform I0 decreases if the voltage waveform Vab increases toward a negative polarity side, and normally becomes a current value which is determined by a resistance R of either the d-axis field magnet winding wire 16 or the q-axis field magnet winding wire 17, and a voltage V.

By switching the operations of each IGBT module, the voltage waveform Vab between the output terminals a and b can become a negative voltage, and thereby it is possible to rapidly reduce the excitation current flowing through the d-axis field magnet winding wire 16 and the q-axis field magnet winding wire 17, and to reduce a magnetic flux.

Figure 11:
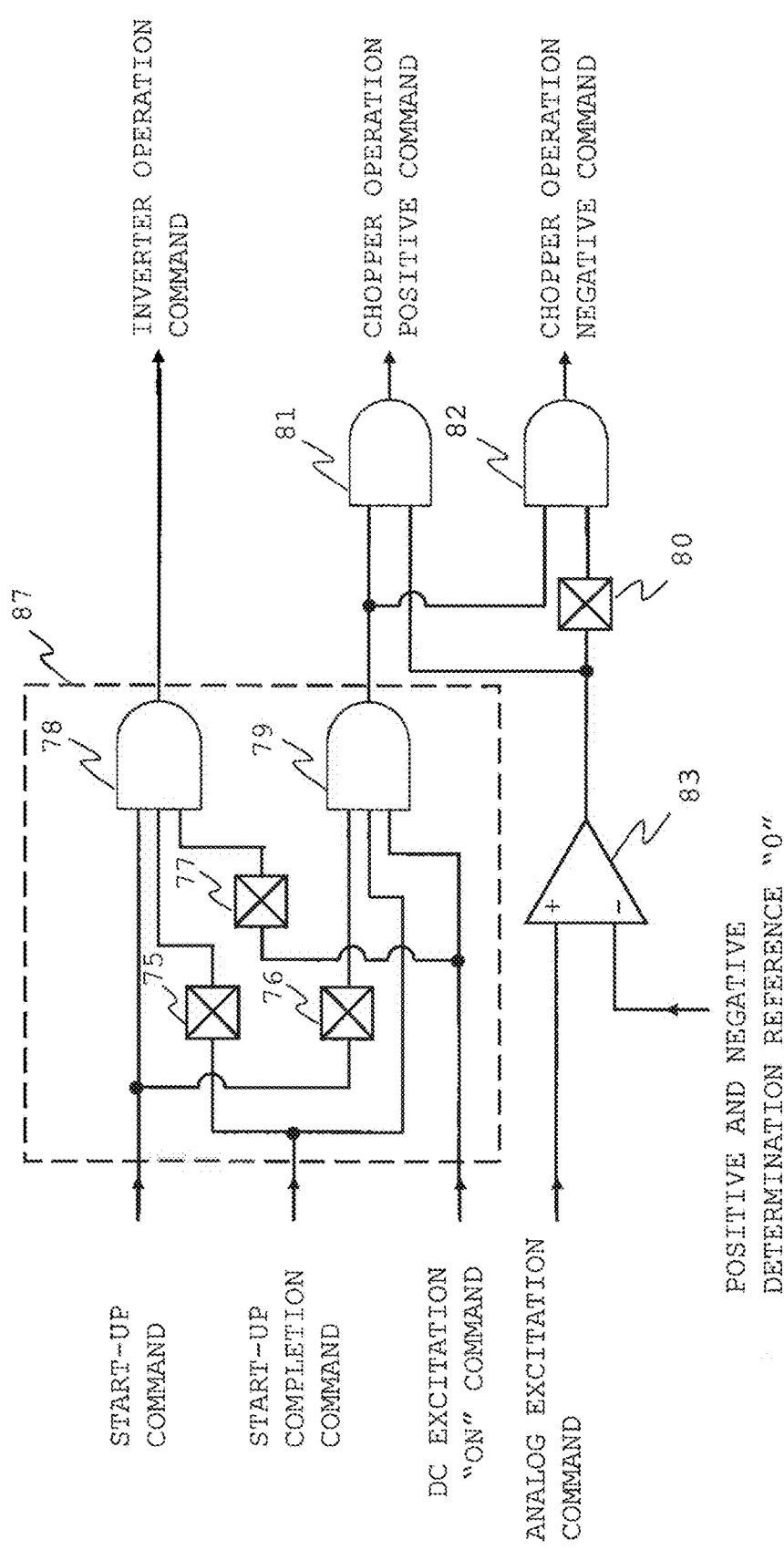
FIG. 11 is a diagram illustrating an operation logic circuit of the single-phase inverter which performs the DC excitation operation of the excitation device according to the second embodiment.

FIG. 11 illustrates an operation logic circuit of a single-phase inverter which performs a DC excitation operation of an excitation device that performs the chopper (positive) operation according to the first embodiment and a chopper (negative) operation, in the operation logic circuit of the single-phase inverters 31 and 32. The circuit has a configuration to which a comparator 83, a NOT logic unit 80, and AND logic units 81 and 82 are added. A logic circuit 87 is the same logic circuit as that of FIG. 8, and compares an analog excitation command with a positive and negative determination reference (0). An output of the comparator 83 becomes "1" if the excitation command is larger than the positive and negative determination reference, and becomes "0" if the excitation command is smaller than the positive and negative determination reference. If the output of the comparator 83 is "1", it is ANDed with the chopper (positive) operation command of the AND logic unit 79 by the AND logic unit 81 and output as the chopper (positive) operation command. In addition, if the output of the comparator 83 is "0", an output of NOT logic unit 80 is ANDed with the chopper (positive) operation command of the AND logic unit 79 by the AND logic unit 82 and output as the chopper (negative) operation command.

In this way, according to the excitation device of the AC exciter according to the second embodiment, the polarity of the output voltage of the single-phase inverter can be changed to a negative polarity during the chopper operation, and thus it is possible to rapidly reduce the excitation current compared to a case in which the output voltage is squeezed to 0 (zero) V during the chopper operation according to the first embodiment. As a result, it is possible to perform fast excitation control, and to improve characteristics of the main power generator whose magnetic flux is reduced due to system failure, load variation, or the like.

In the above description, the excitation command is compared with a case of analog command, but it is also possible to obtain the same effects in a case of digital signal level.

Third Embodiment

Figure 12:
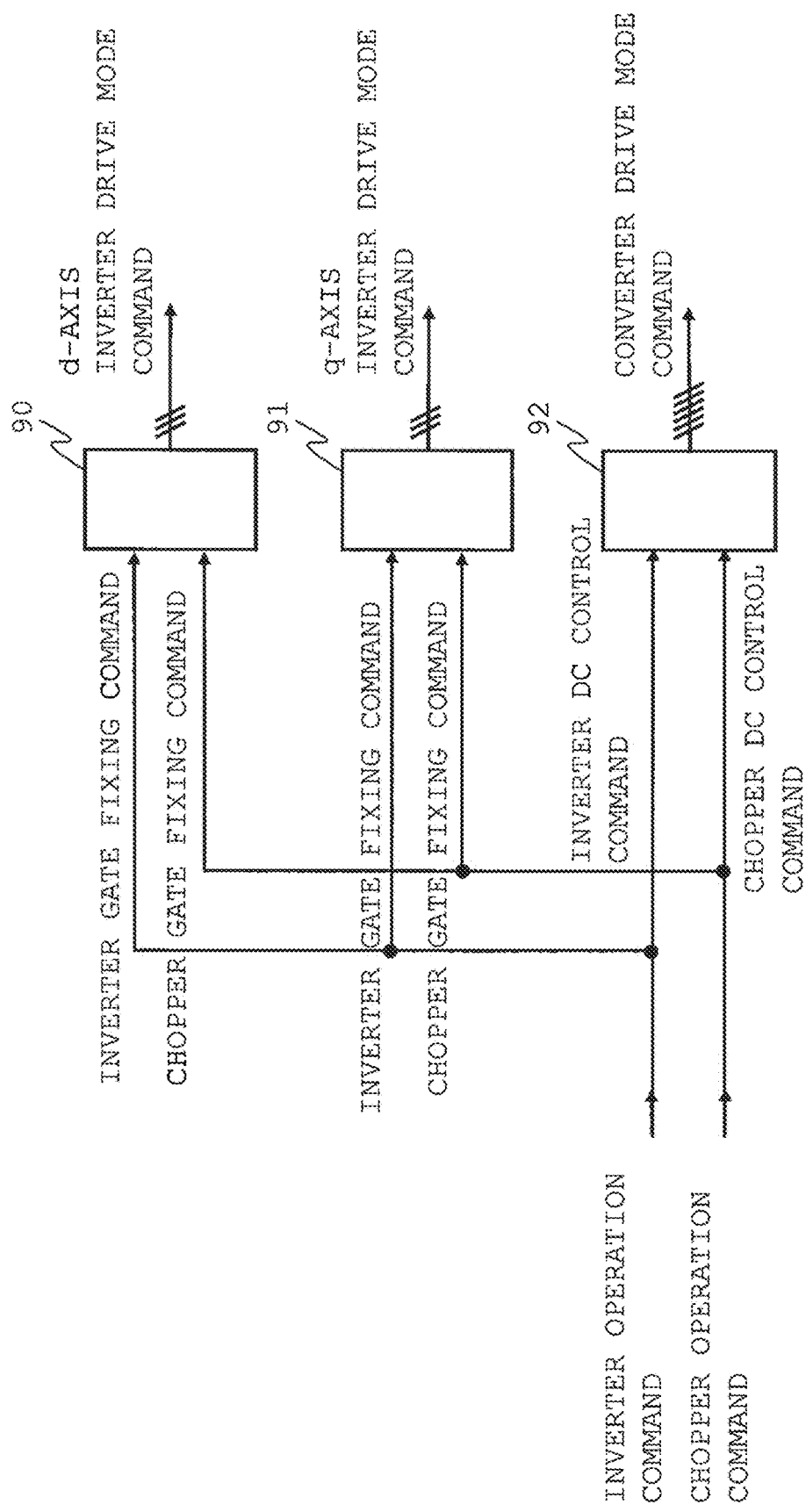
FIG. 12 is a diagram illustrating a drive mode logic circuit of a single-phase inverter of an excitation device according to a third embodiment.

FIG. 12 is a diagram illustrating a drive mode logic circuit of a single-phase inverter of an excitation device of an AC exciter according to a third embodiment. In the first embodiment, the single-phase inverters respectively perform controls of the output voltages, but in the third embodiment, an input DC voltage of the single-phase inverter is controlled by a converter, and thereby an output voltage of the single-phase inverter is controlled. Other configurations are the same as those according to the first embodiment, and thus description thereof will be omitted.

As described in FIG. 12, the drive mode logic circuit of the single-phase inverter is configured by a d-axis inverter drive mode logic unit 90, a q-axis inverter drive mode logic unit 91, and a converter drive mode logic unit 92 which receive an inverter operation command and a chopper operation command.

At the time of start-up, inverter gate fixing commands are input to the d-axis inverter drive mode logic unit 90 and the q-axis inverter drive mode logic unit 91 and an inverter DC control command is input to the converter drive mode logic unit 92, by an inverter operation command. A gate voltage of an IGBT module which performs an inverter operation in the single-phase inverters 31 and 32 becomes constant, a switching operation is performed in a fixing output pattern, a DC voltage output of the converter 41 is controlled, and thereby an AC excitation output from the single-phase inverters 31 and 32 to the d-axis field magnet winding wire 16 and the q-axis field magnet winding wire 17 of the AC exciter 9 is controlled.

In addition, after the start-up is completed and at the time of a normal drive, by the chopper operation command, the chopper gate fixing command is input to the d-axis inverter drive mode logic unit 90 and the q-axis inverter drive mode logic unit 91, and the chopper DC control command is input to the converter drive mode logic unit 92. As a result, a gate voltage of an IGBT module which performs a chopper operation in the single-phase inverters 31 and 32 becomes constant, a chopper operation is performed in a fixing pattern of 100% DC output, a DC voltage output from the converter 41 is controlled, and thereby a DC excitation output from the single-phase inverters 31 and 32 to the d-axis field magnet winding wire 16 and the q-axis field magnet winding wire 17 of the AC exciter 9 is controlled.

In this way, according to the excitation device of the AC exciter according to the third embodiment, a DC voltage input of the single-phase inverter can be controlled by the converter, and thus it is possible to simplify a control circuit of the single-phase inverter, and to reduce voltage variation of the field magnet winding wire of two axes of the AC exciter.

Fourth Embodiment

Figure 13:
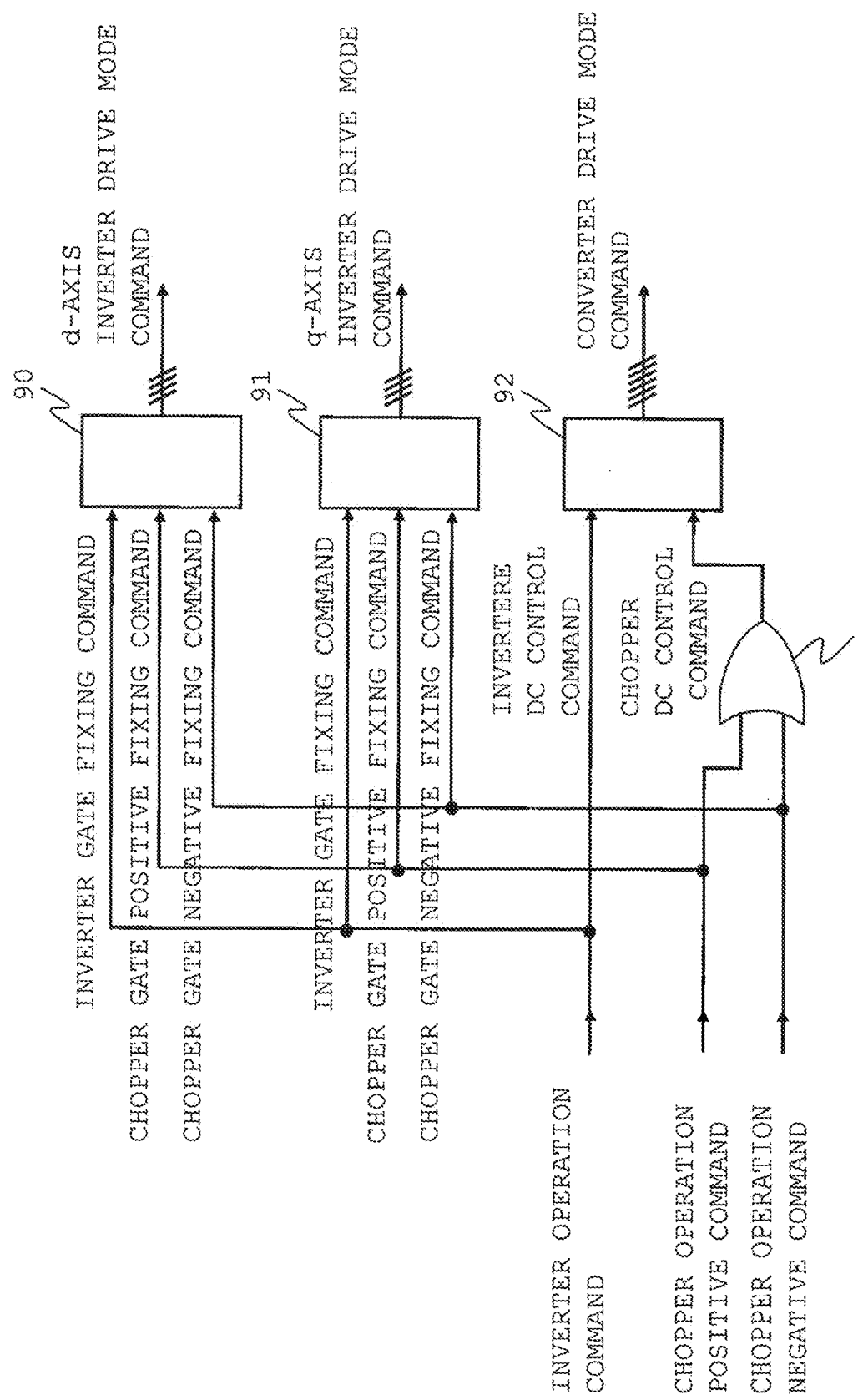
FIG. 13 is a diagram illustrating a drive mode logic circuit of a single-phase inverter of an excitation device according to a fourth embodiment.

FIG. 13 is a diagram illustrating a drive mode logic circuit of a single-phase inverter of an excitation device of an AC exciter according to a fourth embodiment. In the third embodiment, after start-up is completed and at the time of a normal drive, the gate of the IGBT module of the chopper operation of the single-phase inverter becomes a fixing pattern of the 100% DC output, and the DC voltage input of the single-phase inverter is controlled by the converter, but in the fourth embodiment, an IGBT module which performs a chopper operation is switched, and thereby polarity of a voltage output of the single-phase inverter is switched. Other configurations are the same as those according to the third embodiment, and thus description thereof will be omitted.

As illustrated in FIG. 13, a drive mode logic circuit of the single-phase inverter is configured by the d-axis inverter drive mode logic unit 90, the q-axis inverter drive mode logic unit 91, and the converter drive mode logic unit 92 which receive the inverter operation command, the chopper (positive) operation command, and the chopper (negative) operation command, and an OR logic unit 88 coupled to the converter drive mode logic unit 92.

The drive mode logic circuit of the single-phase inverter at the time of start-up is the same as that according to the third embodiment, and thus description thereof will be omitted.

After the start-up is completed and at the time of a normal drive, by the chopper (positive) operation command, the chopper gate fixing command is input to the d-axis inverter drive mode logic unit 90 and the q-axis inverter drive mode logic unit 91, and the chopper DC control command is input to the converter drive mode logic unit 92. As a result, a gate voltage of an IGBT module which performs a chopper operation in the single-phase inverters 31 and 32 becomes constant, a chopper operation is performed in a fixing pattern of 100% DC output, a DC voltage output from the converter 41 is controlled, and thereby a DC excitation output from the single-phase inverters 31 and 32 to the d-axis field magnet winding wire 16 and the q-axis field magnet winding wire 17 of the AC exciter 9 is controlled.

In contrast to this, a rapid reduction of magnetic flux of the main power generator 2 is required at the time of system failure, load variation or the like, and thus, by the chopper (negative) operation command, the chopper gate fixing command is input to the d-axis inverter drive mode logic unit 90 and the q-axis inverter drive mode logic unit 91, the IGBT module which performs a chopper operation is switched, and a chopper DC control command is input to the converter drive mode logic unit 92. As a result, the IGBT module which performs the chopper operation in the single-phase inverters 31 and 32 is switched (refer to FIG. 6 and FIG. 8), and thus the polarity of the voltage outputs of the single-phase inverters 31 and 32 is changed from a positive polarity to a negative polarity. As a result, a voltage with a negative polarity can be applied to the d-axis field magnet winding wire 16 and the q-axis field magnet winding wire 17, and the magnetic flux of the main power generator 2 can be rapidly reduced.

In this way, according to the excitation device of the AC exciter according to the fourth embodiment, the polarity of the voltage output of the single-phase inverter can be changed to a negative polarity during the chopper operation, and thus it is possible to rapidly reduce the excitation current compared to a case in which the output voltage is squeezed to 0 (zero) V during the chopper operation according to the first embodiment, to perform a fast excitation control even if the output voltage is controlled by the converter, and to improve characteristics of the main power generator whose magnetic flux is reduced due to system failure, load variation, or the like.

Fifth Embodiment

Figure 14:
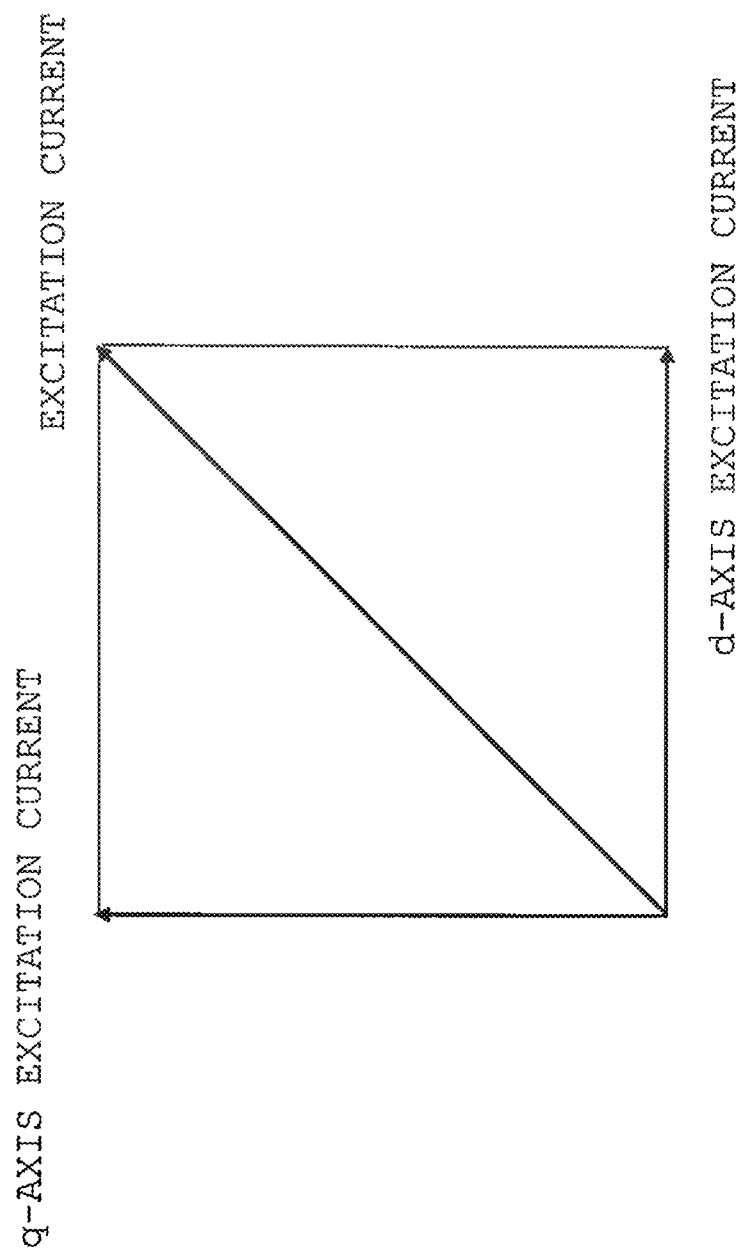
FIG. 14 is a vector diagram of an excitation current of an excitation device according to a fifth embodiment.
Figure 15:
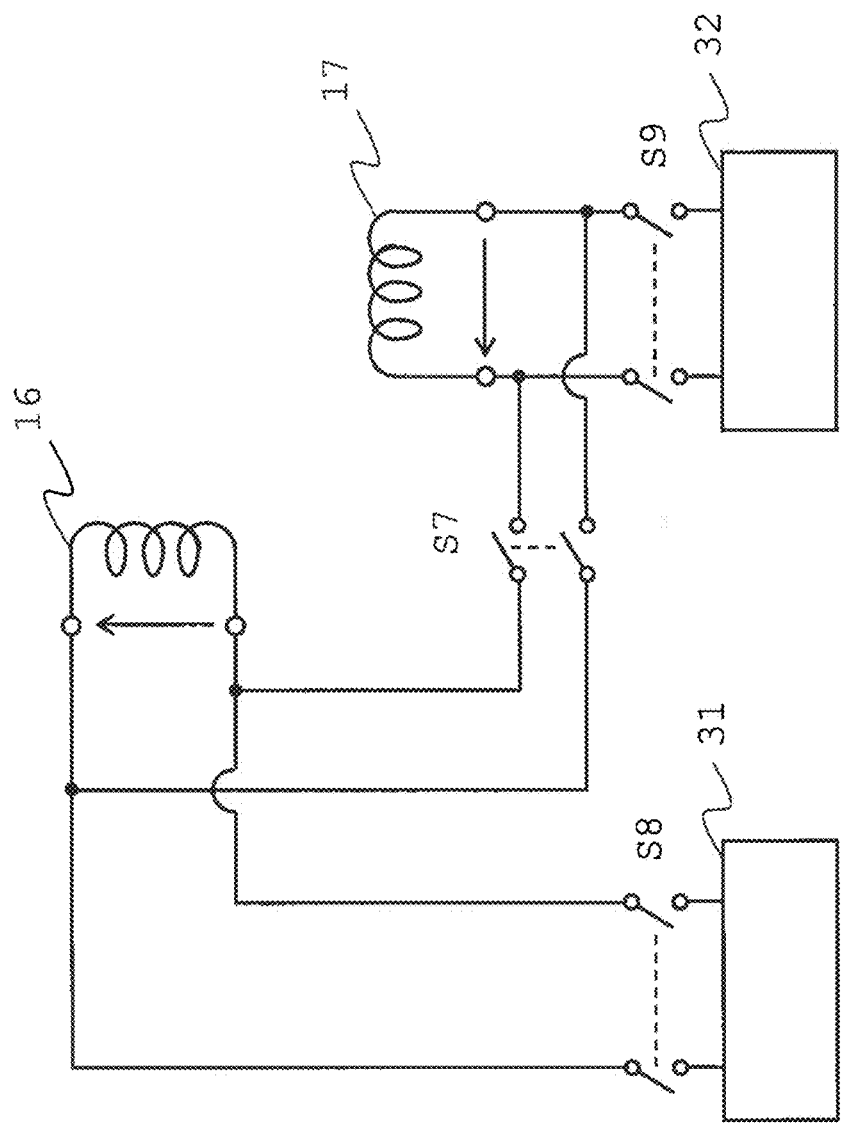
FIG. 15 is a circuit diagram illustrating coupling between a single-phase inverter and a field magnet winding wire according to the fifth embodiment.

FIG. 14 is a vector diagram of a d-axis excitation current and a q-axis excitation current of an excitation device of an AC exciter according to a fifth embodiment. FIG. 15 is a circuit diagram illustrating coupling of a single-phase inverter, a d-axis field magnet winding wire, and a q-axis field magnet winding wire. The coupling of the single-phase inverter, the d-axis field magnet winding wire, and the q-axis field magnet winding wire is different from the coupling of the single-phase inverter, the d-axis field magnet winding wire, and the q-axis field magnet winding wire according to the first to fourth embodiments in that a contactor S7 is provided between the d-axis field magnet winding wire 16 and the q-axis field magnet winding wire 17 in order to couple both the wires in series to each other, a contactor S8 is provided between the d-axis field magnet winding wire 16 and an output side of the single-phase inverter 31, and furthermore a contactor S9 is provided between the q-axis field magnet winding wire 17 and an output side of the single-phase inverter 32. Other configurations are the same as those according to the first embodiment, and thus description thereof will be omitted.

As illustrated in FIG. 14, an excitation current of the AC exciter 9 is obtained by performing vector synthesis of an excitation current flowing through the d-axis field magnet winding wire 16 and an excitation current flowing through the q-axis field magnet winding wire 17. The excitation current has a phase difference of 90 degrees between a d-axis and a q-axis, as an AC current, and if a d-axis excitation current vector is 1.0 and a q-axis excitation current vector is 1.0, the synthesized vector has a phase difference of 45 degrees at a magnitude of √2.

After the start-up is completed and at the time of a normal drive, the two single-phase inverters 31 and 32 perform the DC excitation of the d-axis field magnet winding wire 16 and the q-axis field magnet winding wire 17 in the first to fourth embodiments, but in this case, it is set that the contactor S7 is switched off, the contactor S8 is switched on, and the contactor S9 is switched on.

After the start-up is completed and at the time of a normal drive, in general, DC currents having the same values flow through the d-axis field magnet winding wire 16 and the q-axis field magnet winding wire 17 as excitation currents, but if one of the single-phase inverters 31 and 32 fails, the IGBT element of the single-phase inverter 31 or 32 is turned off, the corresponding contactor S8 or the contactor S9 is switched off, the single-phase inverter 31 or 32 is decoupled from the d-axis field magnet winding wire 16 or the q-axis field magnet winding wire 17, the contactor S7 is switched off, and thus the failed single-phase inverter is decoupled and is coupled in series to the other field magnet winding wire. As a result, even if one of the single-phase inverters fails, power is supplied to the d-axis field magnet winding wire 16 and the q-axis field magnet winding wire 17, and the drive can be continuously performed.

Furthermore, by increasing the current of a normal single-phase inverter by √2 times, the voltage of the main power generator 2 can be set to the original voltage value and normal drive can be continuously performed.

In this way, according to the excitation device of the AC exciter according to the fifth embodiment, a circuit is configured to couple two field magnet winding wires in series to each other, and thus even if one of the single-phase inverters of the excitation device fails, power is supplied from the other single-phase inverter to the field magnet winding wire, and thus it is possible to increase reliability of the excitation device.

Sixth Embodiment

Figure 16:
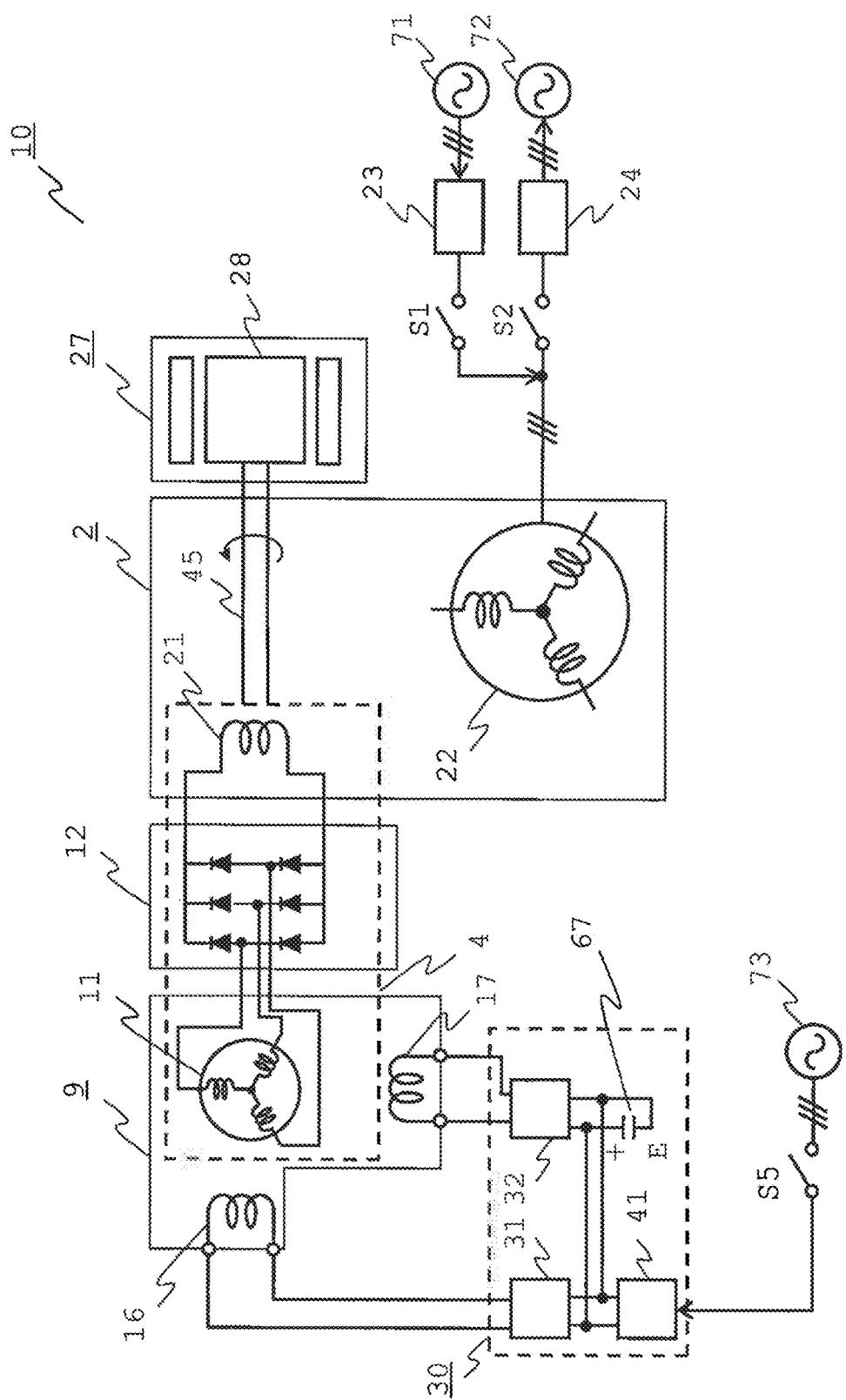
FIG. 16 is a schematic circuit configuration diagram illustrating the entirety of a gas turbine power generation system which is controlled by an AC exciter including an excitation device according to a sixth embodiment.

FIG. 16 is a schematic circuit configuration diagram illustrating the entirety of a gas turbine power generation system which is controlled by an AC exciter including an excitation device according to a sixth embodiment. The excitation device according to the sixth embodiment is different from the excitation device according to the first embodiment illustrated in FIG. 1 in that the DC capacitors 34 and 35 which are coupled in series to each other between the switching elements and the converter 41 in parallel in the single-phase inverters 31 and 32 are provided as illustrated in FIG. 2 and in contrast to this, an electric double layer capacitor 67 which can accumulate a large amount of charges is provided between the single-phase inverters 31 and 32 and the converter 41, in the excitation device 30 according to the sixth embodiment. Other configuration are the same as those according to the first embodiment and thus description thereof will be omitted.

As the capacitor 67 with a large capacity is provided, an excitation device 30 can excite the circuit to the original voltage between 100 ms and several seconds, while excitation is lost between 3 ms to 10 ms in a circuit of the related art with respect to voltage reduction or power loss due to failure or the like of a power system of the excitation power supply 73. As a result, it is not necessary for the PMG 40 to be coupled to the main power generator 2, and it is possible to shorten an axial length of the rotation shaft 45, and to reduce inertia (GD2) of the rotation shaft 45 at the time of start-up.

In this way, according to the excitation device of the AC exciter according to the sixth embodiment, a capacitor with a large capacity is provided on an input side of the single-phase inverter, and thereby even if excitation power supply is lost, it is possible to excite the field magnet winding wire to the original voltage in a longer time. In addition, the PMG is not required, axial length of the rotation shaft can be shortened, and thus it is possible to miniaturize the device.

In the above embodiment, a case in which an electric double layer capacitor is used as a capacitor with a large capacity is described, but other types of capacitors may be used.

Seventh Embodiment

Figure 17:
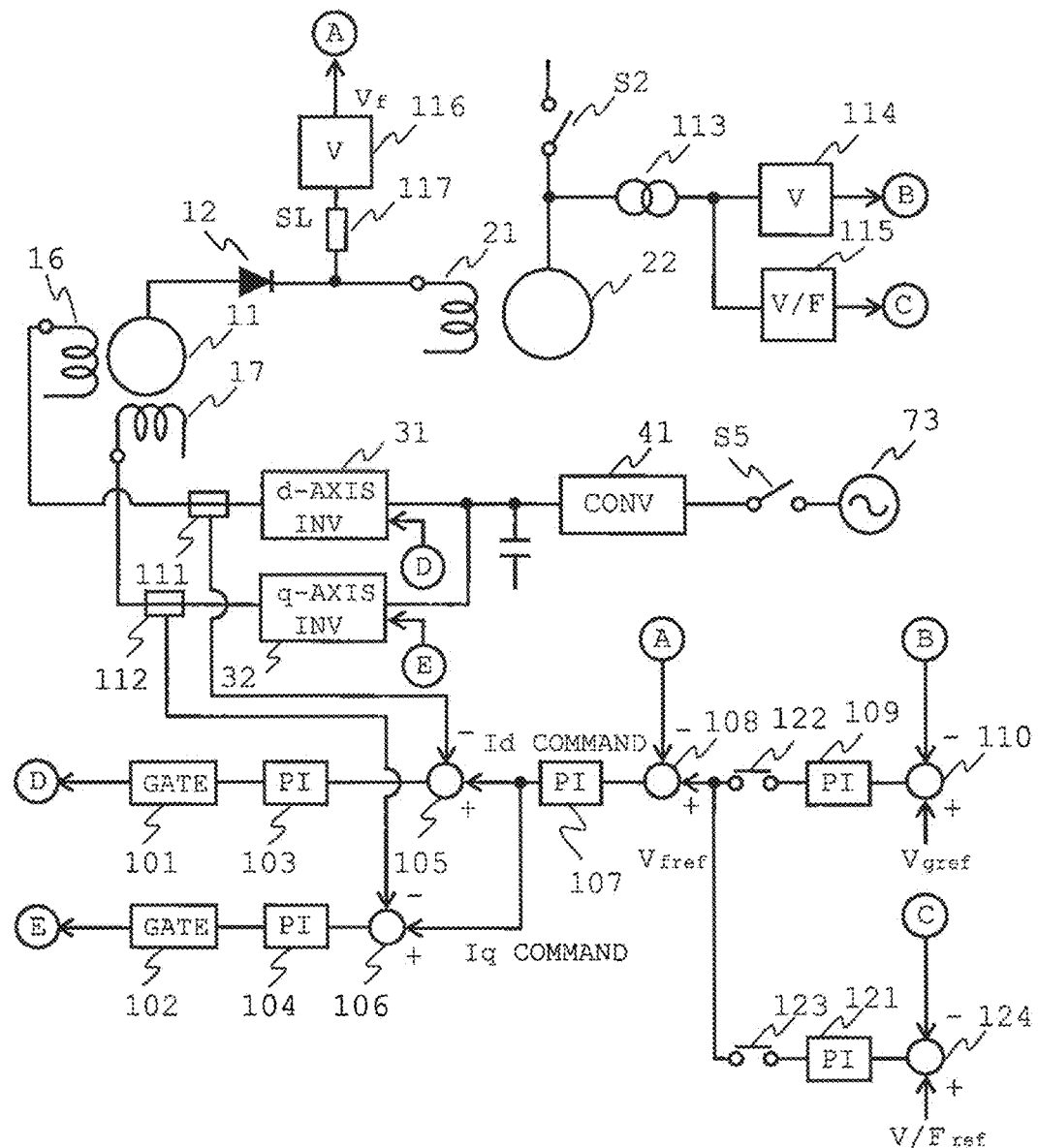
FIG. 17 is a control block circuit diagram illustrating a control system which is controlled by an AC exciter including an excitation device according to a seventh embodiment.

FIG. 17 is a control block circuit diagram illustrating a control system which is controlled by an AC exciter including an excitation device according to a seventh embodiment. In the first to sixth embodiments, the circuit operation of the single-phase inverter is described, but in the seventh embodiment, the entirety of the control system which is controlled by the AC exciter 9 will be described.

The control block circuit diagram illustrated in FIG. 17 includes current sensors 111 and 112 which detect currents of the d-axis field magnet winding wire 16 and the q-axis field magnet winding wire 17, a voltage detector VT113 which detects a voltage of the armature winding wire 22, a voltage converter 114, a voltage and frequency (V/F) ratio converter 115, a slip ring 117 for detecting a voltage of the field magnet winding wire 21, a voltage converter 116, and adding and subtracting units 105, 106, 108, 110, and 124.

In addition, control PI amplifiers 103, 104, 107, 109, and 121 can adjust characteristics of stability of a control loop having a function of proportionability (P)+integration (I), responsiveness, or the like.

The control loop is configured by a current control loop which is formed by control PI amplifiers 103 and 104 and gate forming circuits 101 and 102, a field magnet voltage control loop which is formed by a control PI amplifier 107, and a synchronous apparatus armature voltage control loop which is formed by an armature voltage control PI amplifier 109 and a control switch 122 or a voltage and frequency (V/F) ratio control loop which is formed by a voltage and frequency (V/F) ratio control PI amplifier 121 and a control switch 123. In general, in the beginning of start-up, a field magnet voltage constant control which is performed by the field magnet voltage control loop or a V/F ratio constant control which is performed by the voltage and frequency (V/F) ratio control loop is performed, but after reaching a constant speed, a power generator voltage constant control which is performed by the synchronous apparatus (power generator) armature voltage control loop is performed.

In this way, according to the excitation device of the AC exciter according to the seventh embodiment, at the time of start-up, an output frequency of the single-phase inverter coupled to the field magnet winding wire of the AC exciter becomes constant, an output voltage of the single-phase inverter, that is, a voltage or a current of each winding wire of the AC exciter is controlled, and thereby the control of the field magnet voltage of the AC exciter, and voltage and frequency of the armature or a voltage of the armature is controlled. Accordingly, accurate excitation control can be performed. For this reason, it is possible to perform a stable drive regardless of temperature or non-variation of each winding wire.

Eighth Embodiment

Figure 18:
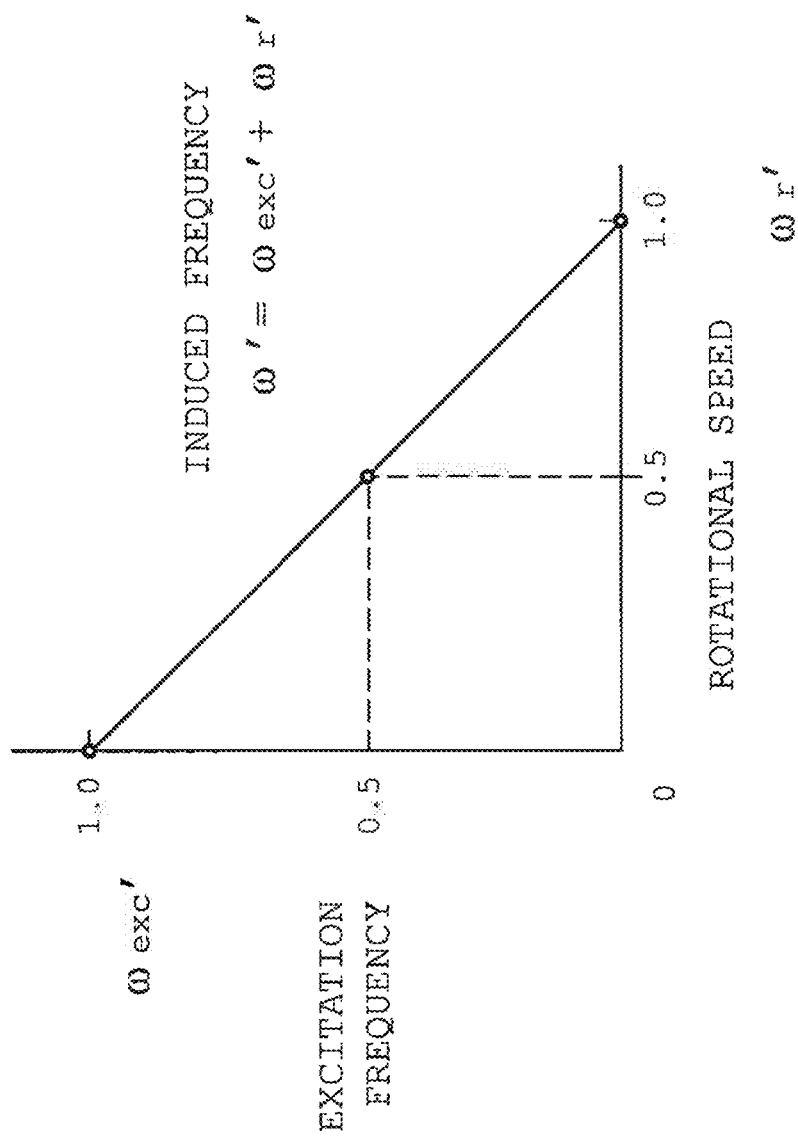
FIG. 18 is a diagram illustrating a relationship between a rotational speed and an excitation frequency of an AC exciter of an excitation device according to an eighth embodiment.

FIG. 18 is a diagram illustrating a relationship between a rotational speed and an excitation frequency of an AC exciter including an excitation device according to an eighth embodiment.

At the time of start-up, if the rotational speed of the AC exciter 9 which is a synchronous apparatus is referred to as ωr' (pu value when the rated rotational speed is set as 1 pu) and an excitation frequency which is generated by the single-phase inverters 31 and 32 is referred to as ωexc' (pu value when the rated rotational speed is set as 1 pu), (ωexc'+ωr') times the voltage is induced in an armature winding wire 11 of the AC exciter 9, if an excitation direction is opposite to a rotation direction. Here, if the excitation frequency increases, the loss of the AC exciter 9 is increased, and thus the excitation frequency ωexc' which is generated by the single-phase inverters 31 and 32 can be reduced in accordance with an increase of the rotational speed ωr' of the AC exciter 9 as illustrated in FIG. 18. Thus, it is possible to reduce loss.

If ωexc'=ω0' (rated rotational speed)−ωr' (rotational speed), the excitation frequency is automatically changed to a DC current. Thus, when the control is switched from start-up to a normal state, variation can be reduced.

In this way, according to the excitation device of the AC exciter according to the eighth embodiment, the output frequency of the single-phase inverter coupled to each field magnet winding wire of the AC exciter is reduced in accordance with an increase of the rotational speed of the AC exciter, the field magnet voltage of the AC exciter, and voltage and frequency of the armature or a voltage of the armature are maintained constant, and thus it is possible to reduce loss and to increase control accuracy by controlling the output voltage of the single-phase inverter, that is, a voltage or a current of each winding wire of the AC exciter.

Ninth Embodiment

Figure 19:
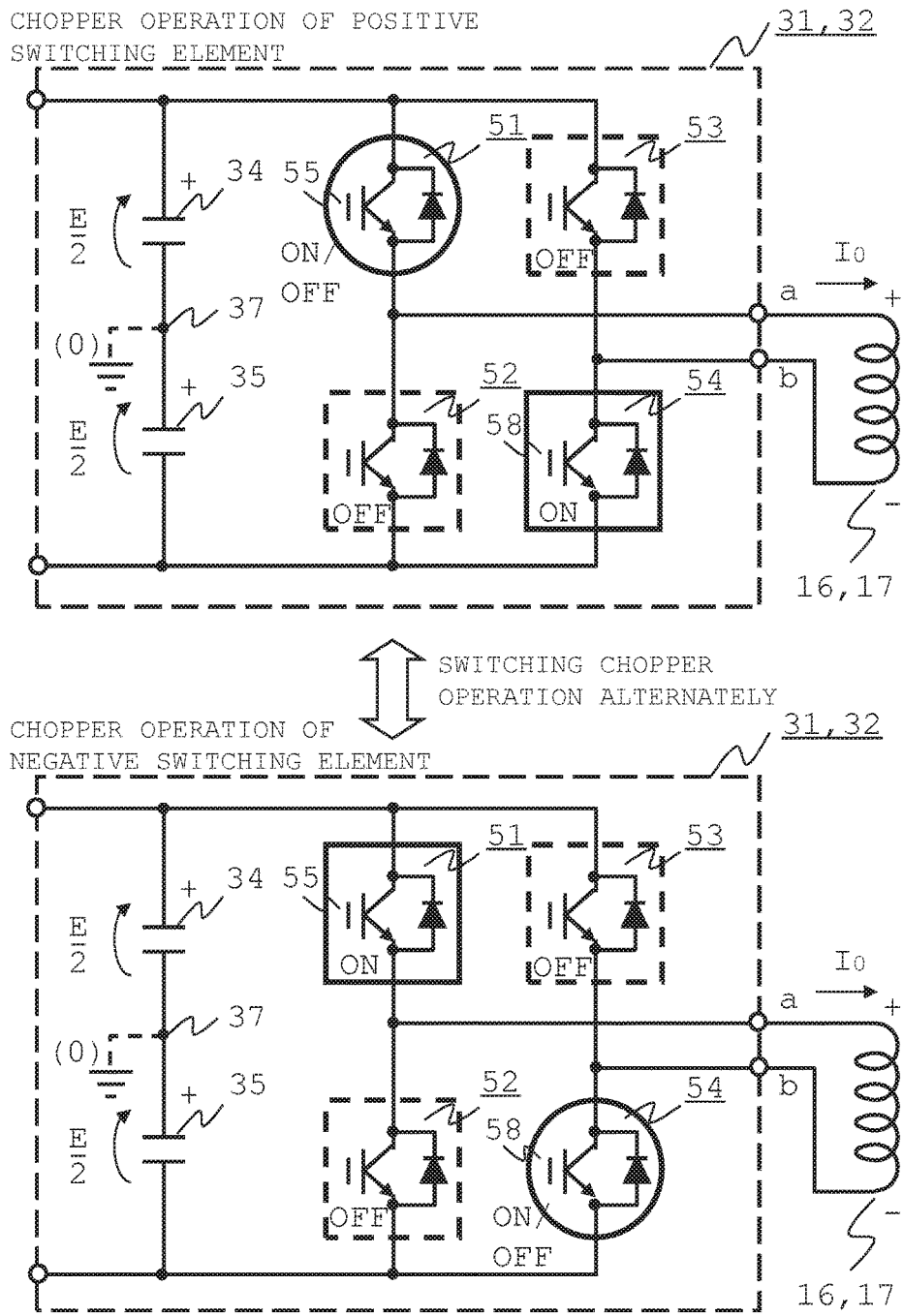
FIG. 19 is a diagram illustrating an operation of a single-phase inverter which performs a DC excitation operation of an excitation device according to a ninth embodiment.
Figure 20:
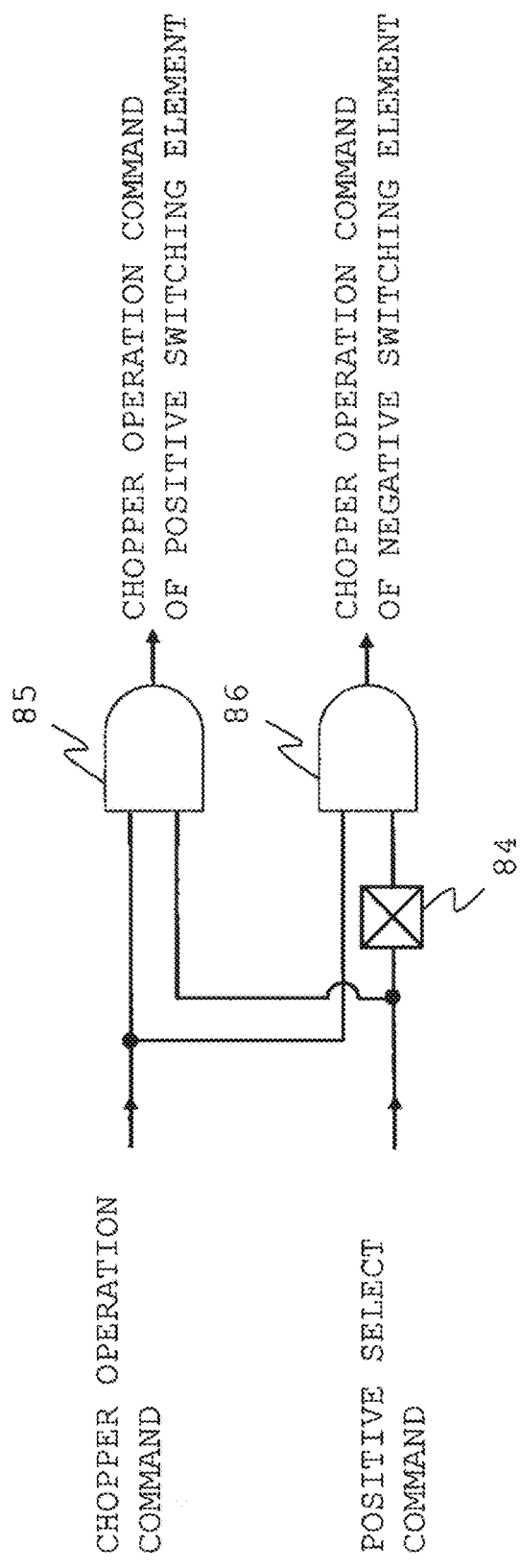
FIG. 20 is a diagram illustrating an operation logic circuit of the single-phase inverter which performs the DC excitation operation of the excitation device according to the ninth embodiment.
Figure 21:
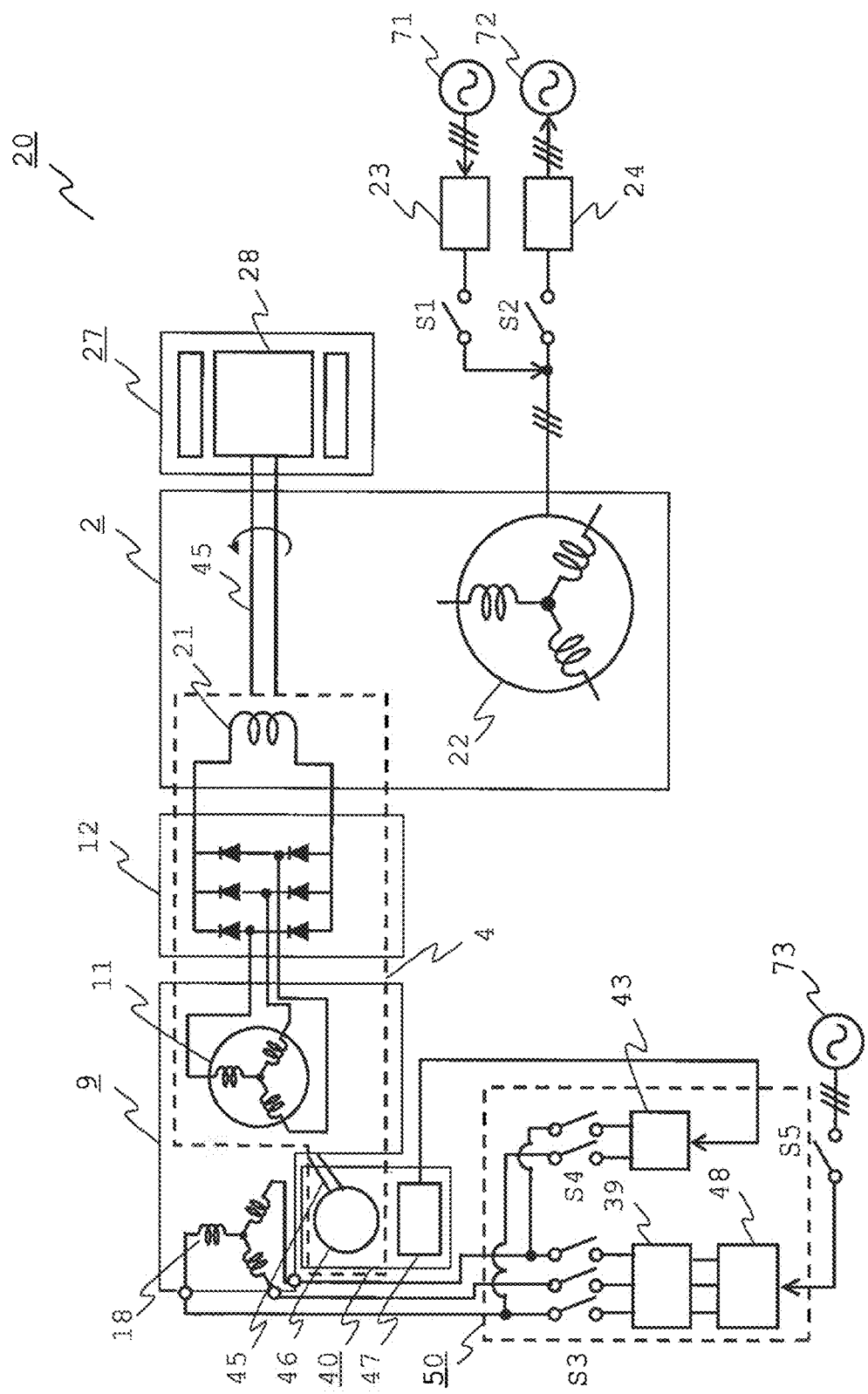
FIG. 21 is a configuration diagram of a gas turbine power generation system which is controlled by an AC exciter including an excitation device in the related art.

FIG. 19 is a diagram illustrating an operation of a single-phase inverter which performs a DC excitation operation of an excitation device according to a ninth embodiment. FIG. 20 is a diagram illustrating an operation logic circuit of the single-phase inverter which performs the DC excitation operation of the excitation device according to the ninth embodiment.

FIG. 20 illustrates a logic circuit which controls a chopper operation of a switching element on a positive polarity side of the single-phase inverter and a chopper operation of a switching element on a negative polarity side of the single-phase inverter. The logic circuit is configured by a NOT logic unit 84 and AND logic units 85 and 86. A chopper operation command (chopper (positive) operation command) of the positive switching element is output from the AND logic unit 85 by which a chopper operation command and a positive select command are ANDed. A chopper operation command (chopper (negative) operation command) of the negative switching element is output from the AND logic unit 86 by which the chopper operation command and an output of the NOT logic unit 84 inverting the positive select command are ANDed.

In the embodiments 1 and 2, a case in which the switching element 55 of the IGBT module 51 on the positive polarity side of the DC capacitor performs a switching operation for the chopper drive, at the time of drive of the chopper operation of the single-phase inverters 31 and 32, is described, as illustrated in FIG. 6. However, in the embodiment 9, the switching element 55 of the IGBT module 51 on the positive polarity side which performs the chopper operation and the switching element 58 of the IGBT module 54 on the negative polarity side which performs the chopper operation are switched to each other for each switching of excitation of the main power generator 2, at the time of drive of the chopper operation of the single-phase inverters 31 and 32, as illustrated in FIG. 19. FIG. 19 illustrates a case of switching two IGBT modules, but four IGBT modules may be sequentially switched. By equalizing the conduction times of the four switching elements, it is possible to prevent a specified switching element from being intensively used. Accordingly, in a case in which the switching element is attached to a heat sink, it is possible to prevent silicone grease which is used to improve thermal conductivity from being dried, and to prolong the maintenance period.

In this way, according to the excitation device of the AC exciter according to the ninth embodiment, at the time of drive of the chopper operation of the single-phase inverter, the IGBT modules performing the chopper operation on the positive polarity side and the negative polarity side are regularly switched, and thereby the conduction times of the switching elements which operate are equalized. Accordingly, it is possible to prevent temperature of the switching elements from increasing, and to prolong a maintenance period.

In the embodiments described above, IGBT elements are used as the switching elements which are used for the single-phase inverter, but modules which are configured by transistors, GTOs, GCTs or the like which are self-extinguishable may be used.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. An excitation device of an AC exciter comprising:
   at least one single-phase inverter configured to supply a current to a plurality of field magnet winding wires of a synchronous apparatus that is the AC exciter, wherein the field magnet winding wires comprise two axes, wherein the at least one single-phase inverter comprises a plurality of switching elements,
   wherein the at least one single-phase inverter performs an inverter operation during a case of AC excitation by configuring the switching elements in a first operation configuration, the at least one single-phase inverter performs a chopper operation during a case of DC excitation by configuring the switching elements in a second operation configuration, and excitement power is supplied to a power generator by the synchronous apparatus, and wherein during the case of DC excitation, at least one of the plurality of switching elements is repetitively switched between an "ON" state and an "OFF" state to perform the chopper operation.

2. The excitation device of the AC exciter according to claim 1,
   wherein at least two of the plurality of switching elements are configured to perform the chopper operation, and
   wherein during the DC excitation, when a first switching element of the portion of the plurality of the switching elements performs the chopper operation via switching, a polarity of an output voltage of the at least one single-phase inverter is positive and when a second switching element of the portion of the plurality of the switching elements performs the chopper operation via switching, the polarity of an output voltage of the at least one single-phase inverter is negative.

3. The excitation device of the AC exciter according to claim 1, further comprising a converter which converts an AC current into a DC current,
   wherein, during the AC excitation and the DC excitation, a voltage control switching operation of the at least one single-phase inverter is constant, the at least one single-phase inverter is controlled by the converter, and thereby an output voltage of the at least one single-phase inverter is controlled.

4. The excitation device of the AC exciter according to claim 3,
   wherein at least two of the plurality of switching elements are configured to perform the chopper operation, and
   wherein during the DC excitation, when a first switching element of the portion of the plurality of the switching elements performs the chopper operation via switching, a polarity of an output voltage of the at least one single-phase inverter is positive and when a second switching element of the portion of the plurality of the switching elements performs the chopper operation via switching, the polarity of an output voltage of the at least one single-phase inverter is negative.

5. The excitation device of the AC exciter according to claim 1, wherein the at least one single-phase inverter comprises two single-phase inverters, wherein, during the DC excitation, if one of two single-phase inverters fails, the failed single-phase inverter is separated from the other single-phase inverter.

6. The excitation device of the AC exciter according to claim 1, further comprising a battery or a capacitor which ears supply power to the at least one single-phase inverter.

7. The excitation device of the AC exciter according to claim 1, wherein during the AC excitation, an output frequency of the at least one single-phase inverter is constant, an output voltage or an output current is controlled, and thereby a field magnet voltage of the synchronous apparatus, and a voltage or a ratio between voltage and frequency of an armature of the synchronous apparatus, are maintained constant.

8. The excitation device of the AC exciter according to claim 1, wherein during the AC excitation, an output frequency of the at least one single-phase inverter is decreased in accordance with an increase of rotation speed of the synchronous apparatus, an output voltage or an output current is controlled, and thereby a field magnet voltage of the synchronous apparatus, and a voltage or a ratio between voltage and frequency of an armature of the synchronous apparatus, are maintained constant.

9. The excitation device of the AC exciter according to claim 2, wherein during the DC excitation, the at least two switching elements, configured to perform the chopper operation, are reversed in active chopper operation, and a number of active chopper operations of the switching elements is equalized.

10. The excitation device of the AC exciter according to claim 4, wherein during the DC excitation, the at least two switching elements, configured to perform the chopper operation, are reversed in active chopper operation, and a number of active chopper operations of the switching elements is equalized.

11. The excitation device of the AC exciter according to claim 9, wherein during active chopper operation of the first switch:
   the first switching element switches between an "ON" state and an "OFF" state for a duration of the active chopper operation of the first switch, and
   the second switching element maintains one of an "ON" state or an "OFF" state for the duration of the active chopper operation of the first switch.

12. The excitation device of the AC exciter according to claim 10, wherein during active chopper operation of the first switch:
   the first switching element switches between an "ON" state and an "OFF" state for a duration of the active chopper operation of the first switch, and
   the second switching element maintains one of an "ON" state or an "OFF" state for the duration of the active chopper operation of the first switch.

13. The excitation device of the AC exciter according to claim 1, wherein:
   the plurality of switches comprise first, second, third, and fourth switches,
   the first operation configuration comprises pulse width modulation operation of the plurality of switches, and
   the second operation configuration comprises operating the first switch between an "ON" state and an "OFF" state during the chopper operation, maintaining the second switch and the third switch in an "OFF" state during the chopper operation, and maintaining the fourth switch in an "ON" state during the chopper operation.

14. The excitation device of the AC exciter according to claim 1, wherein:
   the plurality of switches comprise first, second, third, and fourth switches,
   the first operation configuration comprises pulse width modulation operation of the plurality of switches, and
   the second operation configuration comprises operating the first switch between an "ON" state and an "OFF" state during the chopper operation, maintaining the second switch and the third switch in an "ON" state during the chopper operation, and maintaining the fourth switch in an "OFF" state during the chopper operation.

* * * * *